(12) United States Patent
Jo et al.

(10) Patent No.: US 12,475,701 B2
(45) Date of Patent: Nov. 18, 2025

(54) METHOD AND DEVICE FOR DETERMINING OBJECT INDICATED BY VOICE COMMAND

(71) Applicant: Samsung Electronics Co., Ltd., Suwon-si (KR)

(72) Inventors: Hyeoncheon Jo, Suwon-si (KR); Taegu Kim, Suwon-si (KR); Gajin Song, Suwon-si (KR); Hoseon Shin, Suwon-si (KR); Jaeyung Yeo, Suwon-si (KR); Eunkyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/734,493

(22) Filed: Jun. 5, 2024

(65) Prior Publication Data

US 2025/0022270 A1   Jan. 16, 2025

Related U.S. Application Data

(63) Continuation of application No. PCT/KR2024/004484, filed on Apr. 5, 2024.

(30) Foreign Application Priority Data

Jul. 14, 2023   (KR) .................. 10-2023-0091874
Aug. 16, 2023   (KR) .................. 10-2023-0106932

(51) Int. Cl.
*G06F 3/01* (2006.01)
*G06F 3/16* (2006.01)
(Continued)

(52) U.S. Cl.
CPC ............ *G06V 10/945* (2022.01); *G06F 3/011* (2013.01); *G06F 3/167* (2013.01); *G10L 15/22* (2013.01); *G10L 2015/223* (2013.01)

(58) Field of Classification Search
CPC ....... G06V 10/945; G06F 3/167; G10L 15/22; G10L 2015/223
See application file for complete search history.

(56) References Cited

U.S. PATENT DOCUMENTS 7,340,399 B2    3/2008 Friedrich et al.
2012/0044263 A1* 2/2012 Kim ..................... G06F 16/583
                                          345/633
(Continued)

FOREIGN PATENT DOCUMENTS

JP   2000-149061 A    5/2000
JP      5316453 B2   10/2013
(Continued)

OTHER PUBLICATIONS

International Search Report dated Jul. 15, 2024, issued in International Application No. PCT /KR2024/004484.

*Primary Examiner* — Robert J Michaud
(74) *Attorney, Agent, or Firm* — Jefferson IP Law, LLP

(57) ABSTRACT

An electronic device is provided. The electronic device includes memory storing one or more computer programs, and one or more processors communicatively coupled to the memory, wherein the one or more computer programs include computer-executable instructions that, when executed by the one or more processors, cause the electronic device to detect, based on a voice command obtained from a user, candidate objects in a viewing region of the user, determine a representative property among candidate properties of the detected candidate objects, output, for each of the detected candidate objects, feedback based on a property value of the representative property of a corresponding candidate object, and determine, based on obtaining an additional command that specifies a property value of the representative property from the user, an object indicated in (Continued)

the voice command as a candidate object having the property value of the representative property specified by the additional command.

18 Claims, 14 Drawing Sheets

(51) Int. Cl.
  *G06V 10/94* (2022.01)
  *G10L 15/22* (2006.01)

(56) References Cited

U.S. PATENT DOCUMENTS

| | | | |
|---|---|---|---|
| 2013/0311506 | A1 | 11/2013 | Taubman et al. |
| 2018/0189354 | A1 | 7/2018 | Paine et al. |
| 2021/0279467 | A1* | 9/2021 | Petill ................ G06F 3/012 |

FOREIGN PATENT DOCUMENTS

| | | | |
|---|---|---|---|
| JP | 6099342 B2 | 3/2017 |
| KR | 10-2012-0017869 A | 2/2012 |
| KR | 10-1768521 B1 | 8/2017 |
| KR | 10-2021-0020219 A | 2/2021 |

* cited by examiner

METHOD AND DEVICE FOR DETERMINING OBJECT INDICATED BY VOICE COMMAND

CROSS-REFERENCE TO RELATED APPLICATION(S)

This application is a continuation application, claiming priority under § 365(c) of an International application No. PCT/KR2024/004484, filed on Apr. 5, 2024, which is based on and claims the benefit of a Korean patent application number 10-2023-0091874, filed on Jul. 14, 2023, in the Korean Intellectual Property Office, and of a Korean patent application number 10-2023-0106932, filed on Aug. 16, 2023, in the Korean Intellectual Property Office, the disclosure of each of which is incorporated by reference herein in its entirety.

BACKGROUND

1. Field

The disclosure relates to a technology for determining an object indicated in a voice command.

2. Description of Related Art

Recently, virtual reality (VR), augmented reality (AR), and mixed reality (MR) technologies utilizing computer graphics technology have been developed. The virtual-reality technology refers to technology of establishing a virtual space which does not exist in the real world by using a computer and making the virtual space feel real, and augmented-reality or mixed-reality technology refers to technology of adding information generated by a computer to the real world, that is, technology of combining a virtual world with the real world and enabling a real-time interaction with a user.

The augmented-reality and mixed-reality technology has been widely used by being integrated with another technology (e.g., broadcast technology, medical technology, game technology, and the like) in various fields. Representative examples of integrating the augmented-reality technology and using the augmented-reality technology in the broadcast technology field are a smoothly changing weather map in front of a weather caster who delivers a weather forecast on television (TV) or an advertisement image, which does not exist in a stadium, inserted into a screen in a sports broadcast and broadcasted as if the advertisement image is real.

A representative service for providing a user with augmented reality or mixed reality is the "metaverse". The metaverse is a compound word of "meta" meaning virtual or abstract and "universe" meaning a world, which refers to three-dimensional virtual reality. The metaverse is a more advanced concept than a typical virtual reality environment and provides an augmented-reality environment which absorbs virtual reality, such as a web and the Internet, in the real world.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for determining object indicated by voice command.

Additional aspects will be set forth in part in the description which follows and, in part, will be apparent from the description, or may be learned by practice of the presented embodiments.

In accordance with an aspect of the disclosure, an electronic device is provided. The electronic device includes memory storing one or more computer programs, and one or more processors communicatively coupled to the memory, wherein the one or more computer programs include computer-executable instructions that, when executed by the one or more processors, cause the electronic device to detect, based on a voice command obtained from a user, candidate objects in a viewing region of the user, determine a representative property among candidate properties of the detected candidate objects, output, for each of the detected candidate objects, feedback based on a property value of the representative property of a corresponding candidate object, and determine, based on obtaining an additional command that specifies a property value of the representative property from the user, an object indicated in the voice command as a candidate object having the property value of the representative property specified by the additional command.

In accordance with another aspect of the disclosure, a method performed by an electronic device is provided. The method includes detecting, by the electronic device, based on a voice command obtained from a user, candidate objects in a viewing region of the user, determining, by the electronic device, a representative property among candidate properties of the detected candidate objects, outputting, by the electronic device, for each of the detected candidate objects, feedback based on a property value of the representative property of a corresponding candidate object, and determining, by the electronic device, based on obtaining an additional command that specifies a property value of the representative property from the user, an object indicated in the voice command as a candidate object having the property value of the representative property specified by the additional command.

In accordance with another aspect of the disclosure, one or more non-transitory computer-readable storage media storing one or more computer programs including computer-executable instructions that, when executed by one or more processors of an electronic device, cause the electronic device to perform operations are provided. The operations include detecting, by the electronic device, based on a voice command obtained from a user, candidate objects in a viewing region of the user, determining, by the electronic device, a representative property among candidate properties of the detected candidate objects, outputting, by the electronic device, for each of the detected candidate objects, feedback based on a property value of the representative property of a corresponding candidate object, and determining, by the electronic device, based on obtaining an additional command that specifies a property value of the representative property from the user, an object indicated in the voice command as a candidate object having the property value of the representative property specified by the additional command.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
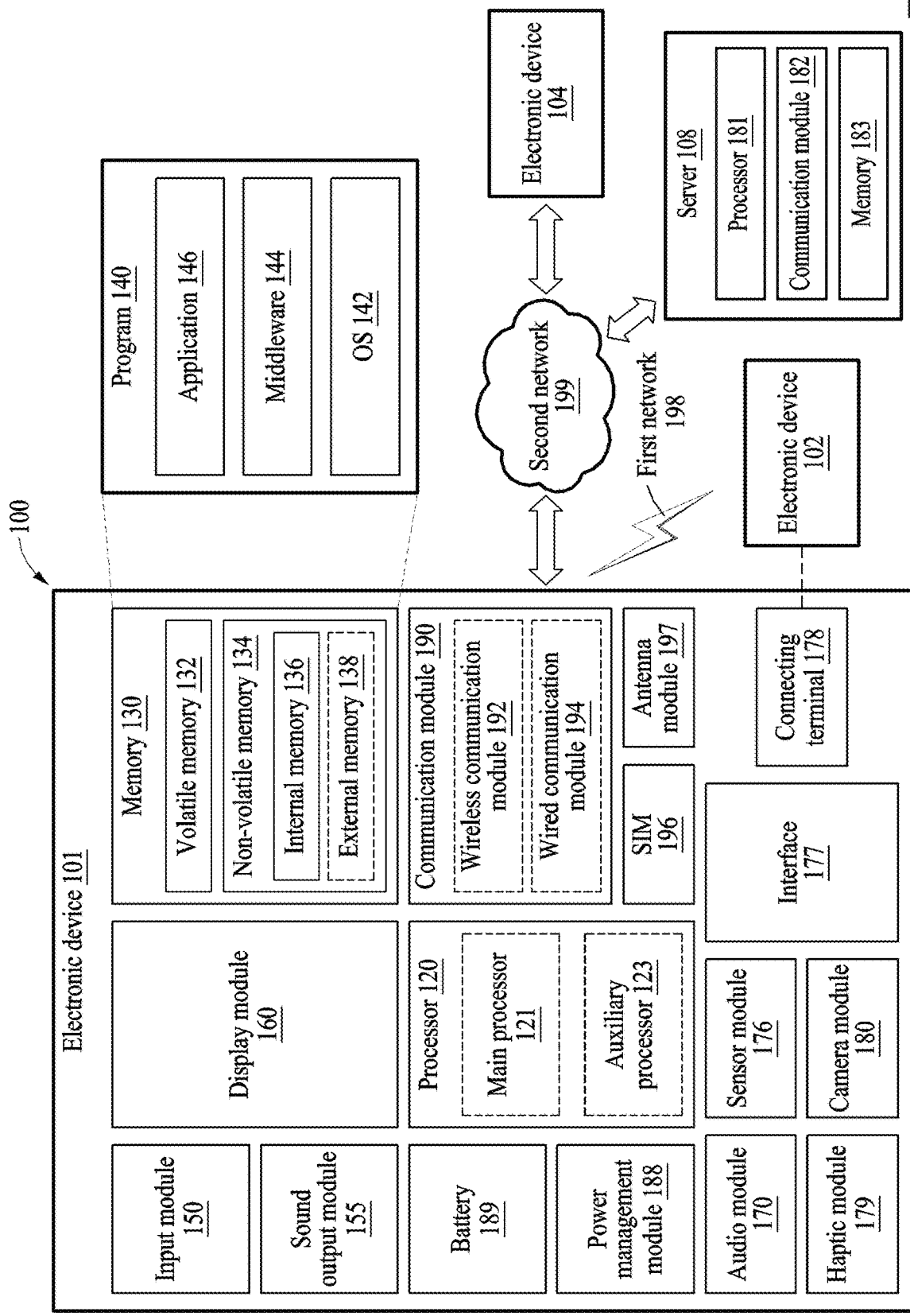
FIG. 1 is a block diagram illustrating a configuration of an electronic device according to an embodiment of the disclosure.

FIG. 1 is a block diagram illustrating a configuration of an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 executes, for example, software (e.g., a program 140) to control at least one other component (e.g., a hardware or software component) of the electronic device 101 connected to the processor 120, and performs various data processing or computation. According to an embodiment, as at least a part of data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 are adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for processing of an artificial intelligence (AI) model. The AI model may be generated by machine learning. Such learning is performed by, for example, the electronic device 101 in which artificial intelligence is performed, or performed via a separate server (e.g., the server 108). Learning algorithms includes, but are not limited to, for example, supervised learning, unsupervised learning, semi-supervised learning, or reinforcement learning. The AI model may include a plurality of artificial neural network layers. An artificial neural network includes, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data includes, for example, software (e.g., the program 140) and input data or output data for a command related thereto. The memory 130 may include the volatile memory 132 or the non-volatile memory 134.

The program 140 may be stored as software in the memory 130, and includes, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 includes, for example, a microphone, a mouse, a keyboard, a key (e.g., a button), or a digital pen (e.g., a stylus pen).

The sound output module 155 may output a sound signal to the outside of the electronic device 101. The sound output module 155 includes, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 (e.g., a display) may visually provide information to the outside (e.g., a user) of the electronic device 101. The display module 160 includes, for example, a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electric signal or vice versa. According to an embodiment, the audio module 170 may obtain the sound via the input module 150, or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 includes, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 includes, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 includes, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 includes, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 is implemented as, for example, at least a part of a power management integrated circuit (PMIC).

The battery 189 may supply power to at least one component of the electronic device 101. According to an embodiment, the battery 189 includes, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multi components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mm Wave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, are selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199.

Each of the external electronic devices 102 and 104, and the server 108 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, requests the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. In the disclosure, an example in which the electronic device 101 is an augmented reality (AR) device (e.g., an electronic device 201 of FIG. 2, an electronic device 301 of FIG. 3, or an electronic device 401 of FIGS. 4A and 4B), and the server 108 among the external electronic devices 102 and 104, and the server 108 transmits, to the electronic device 101, a result of executing a virtual space and an additional function or service associated with the virtual space will be mainly described.

The server 108 may include a processor 181, a communication module 182, and memory 183. The processor 181, the communication module 182, and the memory 183 may be similarly configured to the processor 120, the communication module 190, and the memory 130 of the electronic device 101. For example, the processor 181 provides a virtual space and an interaction between users in the virtual space by executing instructions stored in the memory 183. The processor 181 may generate at least one of visual information, auditory information, or tactile information of the virtual space and objects in the virtual space. For example, as the visual information, the processor 181 generates rendered data (e.g., visual rendered data) obtained by rendering an appearance (e.g., a shape, size, color, or texture) of the virtual space and an appearance (e.g., a shape, size, color, or texture) of an object positioned in the virtual space. In addition, the processor 181 may generate rendered data obtained by rendering a change (e.g., an appearance change of an object, sound generation, or tactile sensation generation) based on at least one of interactions between objects (e.g., a physical object, a virtual object, or an avatar object) in the virtual space or a user input for an object (e.g., a physical object, a virtual object, or an avatar object). The communication module 182 may establish communication with a first electronic device (e.g., the electronic device 101) of a user and a second electronic device (e.g., the electronic device 102) of another user. The communication module 182 may transmit at least one of the visual information, the auditory information, or the tactile information described above to the first electronic device and the second electronic device. For example, the communication module 182 transmits the rendering data.

For example, the server 108 renders content data executed in an application and transmits the rendered content data to the electronic device 101, and the electronic device 101 receiving the data outputs the content data to the display module 160. If the electronic device 101 detects a user movement through an inertial measurement unit (IMU) sensor, the processor 120 of the electronic device 101 may correct rendered data received from the external electronic device 102 based on information of the motion, and output the data to the display module 160. Alternatively, the processor may transmit the information of the motion to the server 108 to request rendering such that screen data is updated accordingly. However, embodiments are limited thereto, and the rendering may be performed by various types of external electronic devices (e.g., 102 and 104) such as a smartphone or a case device for storing and charging the electronic device 101. The rendering data corresponding to the virtual space generated by the external electronic devices 102 and 104 may be provided to the electronic device 101. In another example, the electronic device 101 may receive virtual spatial information (e.g., vertex coordinates, texture, and color defining a virtual space) and object information (e.g., vertex coordinates, texture, and color defining an appearance of an object) from the server 108 and perform rendering by itself based on the received data.

Figure 2:
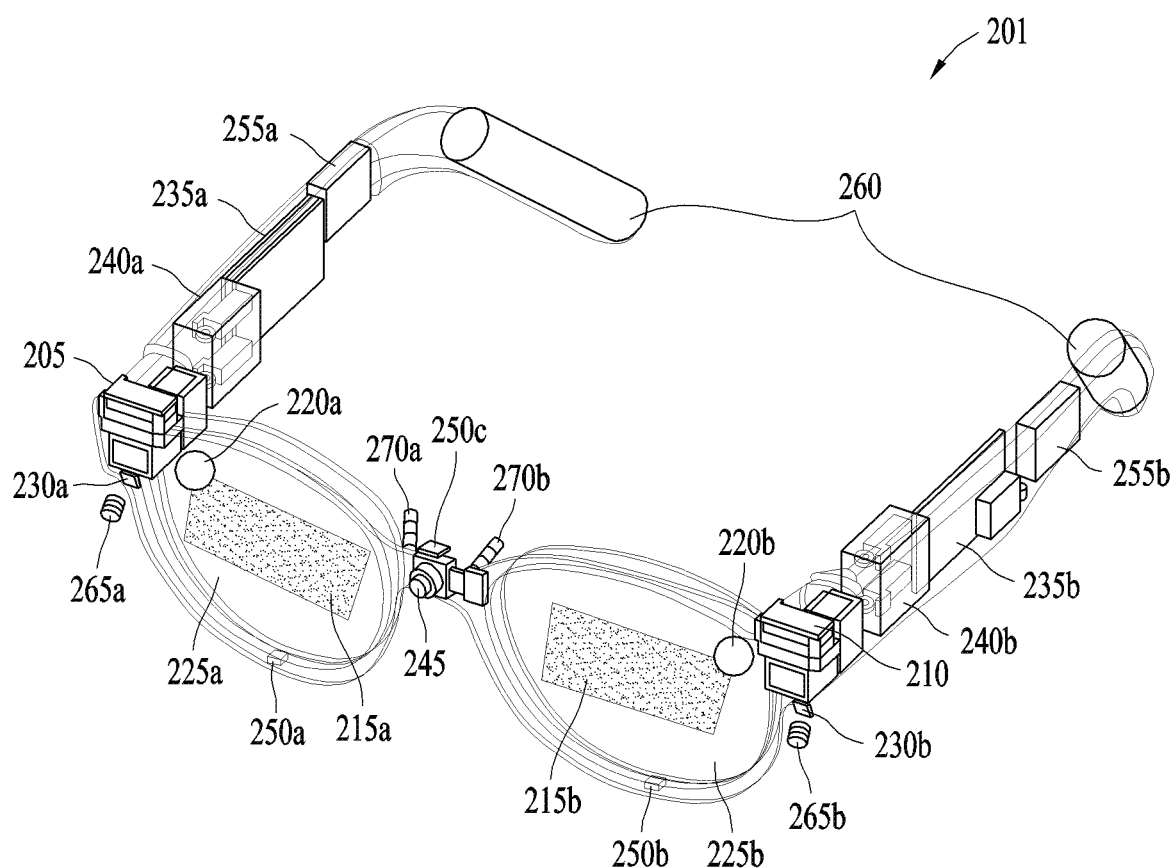
FIG. 2 illustrates an optical see-through (OST) device according to an embodiment of the disclosure.

FIG. 2 illustrates an optical see-through (OST) device according to an embodiment of the disclosure.

Referring to FIG. 2, an electronic device 201 may include at least one of a display (e.g., the display module 160 of FIG. 1), a vision sensor, light sources 230a and 230b, an optical element, or a substrate. The electronic device 201 including a transparent display and providing an image through the transparent display may be referred to as an OST device.

For example, the display includes a liquid crystal display (LCD), a digital mirror device (DMD), a liquid crystal on silicon (LCoS), an organic light-emitting diode (OLED), or a micro light-emitting diode (micro-LED).

In an embodiment, when the display is one of an LCD, a DMD, or an LCoS, the electronic device 201 may include the light sources 230a and 230b configured to emit light to a screen output area (e.g., screen display portions 215a and 215b) of the display. In another embodiment, when the display is capable of generating light by itself, for example, when the display is either the OLED or the micro-LED, the electronic device 201 provides a virtual image with a relatively high quality to a user even though the separate light sources 230a and 230b are not included. For example, when the display is implemented as an OLED or a micro-LED, the light sources 230a and 230b is unnecessary, which may lead to lightening of the electronic device 201.

Referring to FIG. 2, the electronic device 201 may include the display, a first transparent member 225a, and/or a second transparent member 225b, and the user may use the electronic device 201 while wearing the electronic device 201 on a face of the user. The first transparent member 225a and/or the second transparent member 225b may be formed of a glass plate, a plastic plate, or a polymer, and may be transparently or translucently formed. According to an embodiment, the first transparent member 225a may be disposed to face the right eye of the user, and the second transparent member 225b may be disposed to face the left eye of the user. The display may include a first display 205 configured to output a first image (e.g., a right image) corresponding to the first transparent member 225a, and a second display 210 configured to output a second image (e.g., a left image) corresponding to the second transparent member 225b. According to an embodiment, when each display is transparent, the displays and the transparent members may be disposed to face the eyes of the user to configure the screen display portions 215a and 215b.

In an embodiment, a light path of light emitted from the displays 205 and 210 may be guided by a waveguide through the input optical members 220a and 220b. Light moving into the waveguide may be guided toward eyes of a user through an output optical member (e.g., an output optical member 340 of FIG. 3). The screen display portions 215a and 215b may be determined based on light emitted toward the eyes of the user.

For example, the light emitted from the displays 205 and 210 is reflected from a grating region of the waveguide formed in the input optical members 220a and 220b and the screen display portions 215a and 215b, and is transmitted to the eyes of the user.

The optical element may include at least one of a lens or an optical waveguide.

The lens may adjust a focus such that a screen output to the display may be visible to the eyes of the user. The lens includes, for example, at least one of a Fresnel lens, a pancake lens, or a multichannel lens.

The optical waveguide may transmit image rays generated by the display to the user's eyes. For example, the image rays represents rays of light emitted by the light sources 230a and 230b, that have passed through the screen output area of the display. The optical waveguide may be formed of glass, plastic, or a polymer. The optical waveguide may have a nanopattern formed on one inside surface or one outside surface, for example, a grating structure of a polygonal or curved shape. A structure of the optical waveguide will be described below with reference to FIG. 3.

The vision sensor may include at least one of a camera sensor or a depth sensor.

First cameras 265a and 265b are cameras for recognition and may be cameras used for 3 degrees of freedom (DoF) and 6DoF head tracking, hand detection, hand tracking, and spatial recognition. The first cameras 265a and 265b may mainly include a global shutter (GS) camera. Since a stereo camera is required for head tracking and spatial recognition, the first cameras 265a and 265b may include two or more GS cameras. A GS camera may have a more excellent performance compared to a rolling shutter (RS) camera, in terms of detecting and tracking a fine movement, such as a quick movement of a hand or a finger. For example, the GS camera has a low image blur. The first cameras 265a and 265b may capture image data used for spatial recognition for 6DoF and a simultaneous localization and mapping (SLAM) function through depth imaging. In addition, a user gesture recognition function may be performed based on image data captured by the first camera 265a and 265b.

Second cameras 270a and 270b, which are eye tracking (ET) cameras, may be used to capture image data for detecting and tracking the pupils of the user. The second cameras 270a and 270b will be described below with reference to FIG. 3.

A third camera 245 may be a camera for image capturing. The third camera 245 may include a high-resolution (HR) camera to capture an HR image or a photo video (PV) image. The third camera 245 may include a color camera having functions for obtaining a high-quality image, such as, an automatic focus (AF) function and an optical image stabilizer (OIS). The third camera 245 may be a GS camera or an RS camera.

A fourth camera (e.g., face recognition cameras 425 and 426 of FIG. 4B below) is a face recognition camera, and a face tracking (FT) camera may be used to detect and track facial expressions of the user.

A depth sensor (not shown) may be a sensor configured to sense information for determining a distance to an object such as time of flight (TOF). The TOF may refer to a technology for measuring a distance to an object using a signal (e.g., a near infrared ray, ultrasound, laser, etc.). A TOF-based depth sensor may transmit a signal from a transmitter and measure the signal by a receiver, thereby measuring a TOF of the signal.

The light sources 230a and 230b (e.g., illumination modules) may include an element (e.g., an LED) configured to emit light of various wavelengths. The illumination module may be attached to various positions depending on the purpose of use. In an example of use, a first illumination module (e.g., an LED element), attached around a frame of an AR glasses device, may emit light for assisting gaze detection when tracking a movement of the eyes with an ET camera. The first illumination module may include, for example, an IR LED of an infrared wavelength. In another example of use, a second illumination module (e.g., an LED element) may be attached around hinges 240a and 240b connecting a frame and a temple or attached in proximity to a camera mounted around a bridge connecting the frame. The second illumination module may emit light for supplementing ambient brightness when the camera captures an image. When it is not easy to detect a subject in a dark environment, the second illumination module may emit light.

Substrates 235a and 235b (e.g., printed-circuit boards (PCBs)) may support the components described above.

The PCB may be disposed on temples of the glasses. A flexible PCB (FPCB) may transmit an electrical signal to each module (e.g., a camera, a display, an audio module, and a sensor module) and another PCB. According to an embodiment, at least one PCB may include a first substrate, a second substrate, and an interposer disposed between the first substrate and the second substrate. In another example, the PCB may be disposed at a center of a set. An electrical signal may be transmitted to each module and the other PCB through the FPCB.

The other components may include, for example, at least one of a plurality of microphones (e.g., a first microphone 250a, a second microphone 250b, and a third microphone 250c), a plurality of speakers (e.g., a first speaker 255a and a second speaker 255b), a battery 260, an antenna, or a sensor (e.g., an acceleration sensor, a gyro sensor, a touch sensor, etc.).

Figure 3:
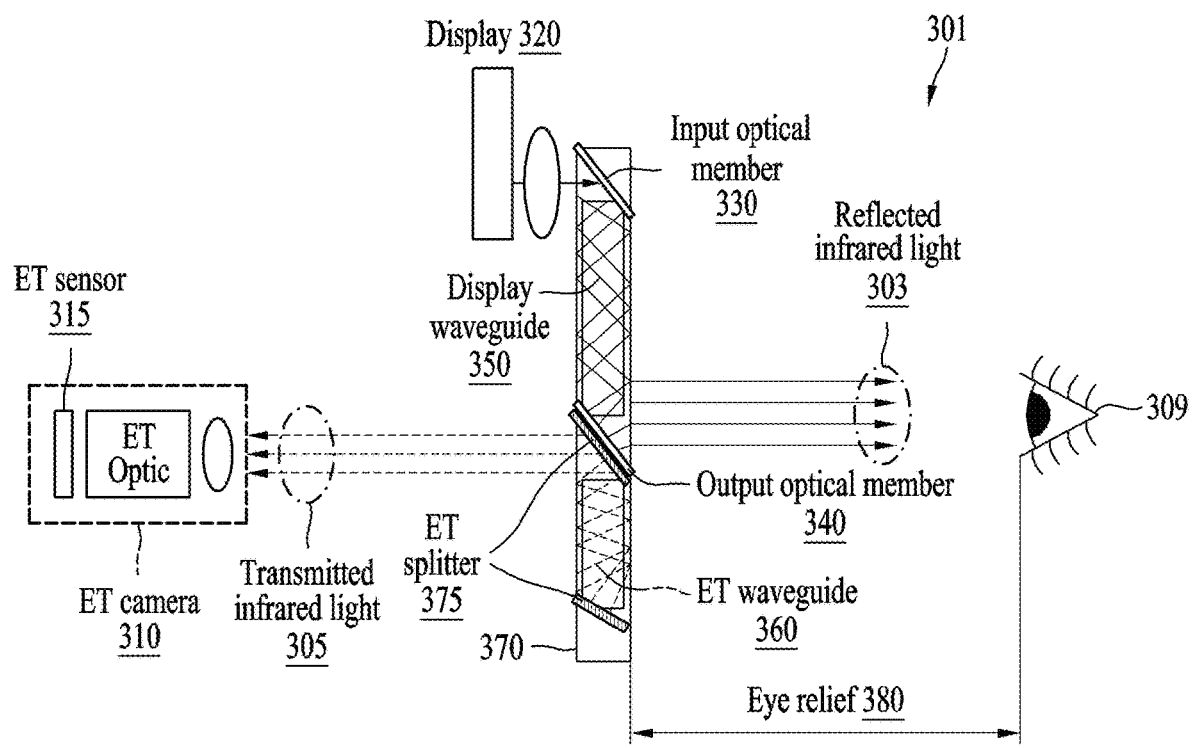
FIG. 3 illustrates an example of an optical system of an eye-tracking (ET) camera, a transparent member, and a display according to an embodiment of the disclosure.

FIG. 3 illustrates an example of an optical system of an ET camera, a transparent member, and a display according to an embodiment of the disclosure.

FIG. 3 is a diagram illustrating an operation of an ET camera included in an electronic device according to an embodiment of the disclosure.

Referring to FIG. 3, a process in which an ET camera 310 (e.g., the second cameras 270a and 270b of FIG. 2) of an electronic device 301 according to an embodiment tracks an eye 309 of a user, e.g., a gaze of the user, using light (e.g., infrared light) output from a display 320 (e.g., the first display 205 and the second display 210 of FIG. 2) is illustrated.

A second camera (e.g., the second cameras 270a and 270b of FIG. 2) may be the ET camera 310 that collects information for positioning a center of a virtual image projected onto the electronic device 301 according to a direction at which pupils of a wearer of the electronic device 301 gaze. The second camera may also include a GS camera to detect the pupils and track a rapid movement of the pupils. The ET cameras may be installed for a right eye and a left eye, and the ET cameras having the same camera performance and specifications may be used. The ET camera 310 may include an ET sensor 315. The ET sensor 315 may be included inside the ET camera 310. The infrared light output from the display 320 may be transmitted as a reflected infrared light 303 to the eye 309 of the user by a half mirror. The ET sensor 315 may detect a transmitted infrared light 305 that is generated when the reflected infrared light 303 is reflected from the eye 309 of the user. The ET camera 310 may track the eye 309 of the user, that is, the gaze of the user, based on a result of the detection by the ET sensor 315.

The display 320 may include a plurality of visible light pixels and a plurality of infrared pixels. The visible light pixels may include red (R), green (G), and blue (B) pixels. The visible light pixels may output visible light corresponding to a virtual object image. The infrared pixels may output infrared light. The display 320 may include, for example, micro LEDs, or OLEDs.

A display waveguide 350 and an ET waveguide 360 may be included in a transparent member 370 (e.g., the first transparent member 225a and the second transparent member 225b of FIG. 2). The transparent member 370 may be formed as, for example, a glass plate, a plastic plate, or a polymer, and may be transparently or translucently formed. The transparent member 370 may be disposed to face an eye of a user. In this case, a distance between the transparent member 370 and the eye 309 of the user may be referred to as an "eye relief" 380.

The transparent member 370 may include the display waveguide 350 and the ET waveguide 360. The transparent member 370 may include an input optical member 330 and an output optical member 340. In addition, the transparent member 370 may include an ET splitter 375 that splits the input light into several waveguides.

According to an embodiment, light incident to one end of the display waveguide 350 may be propagated inside the display waveguide 350 by a nanopattern and may be provided to a user. In addition, the display waveguide 350 formed of a free-form prism may provide incident light as an image ray to the user through a reflection mirror. The display waveguide 350 may include at least one of a diffractive element (e.g., a diffractive optical element (DOE) or a holographic optical element (HOE)) or a reflective element (e.g., a reflection mirror). The display waveguide 350 may guide a display light (e.g., the image ray) emitted from the light source to the eyes of the user, using at least one of the diffractive element or the reflective element included in the display waveguide 350. For reference, although FIG. 3 illustrates that the output optical member 340 is separate from the ET waveguide 360, the output optical member 340 may be included in the ET waveguide 360.

According to an embodiment, the diffractive element may include the input optical member 330 and the output optical member 340. For example, the input optical member 330 may refer, for example, to an "input grating region". The output optical member 340 may refer, for example, to an "output grating region". The input grating region may serve as an input end that diffracts (or reflects) light, that is output from a micro-LED, to transmit the light to a transparent member (e.g., the first transparent member and the second transparent member) of a screen display portion. The output grating region may serve as an exit that diffracts (or reflects), to the eyes of the user, the light transmitted to the transparent member (e.g., the first transparent member and the second transparent member) of a waveguide.

According to an embodiment, the reflective element may include a total reflection optical element or a total reflection waveguide for total internal reflection (TIR). For example, TIR, which is one scheme for inducing light, may form an angle of incidence such that light (e.g., a virtual image) entering through the input grating region is completely reflected from one surface (e.g., a specific surface) of the waveguide, to completely transmit the light to the output grating region.

In an embodiment, a light path of the light emitted from the display 320 may be guided by the waveguide through the input optical member 330. The light moving the inside of the waveguide may be guided toward the eyes of the user through the output optical member 340. The screen display portion may be determined based on the light emitted toward the eyes of the user.

Figure 4A:
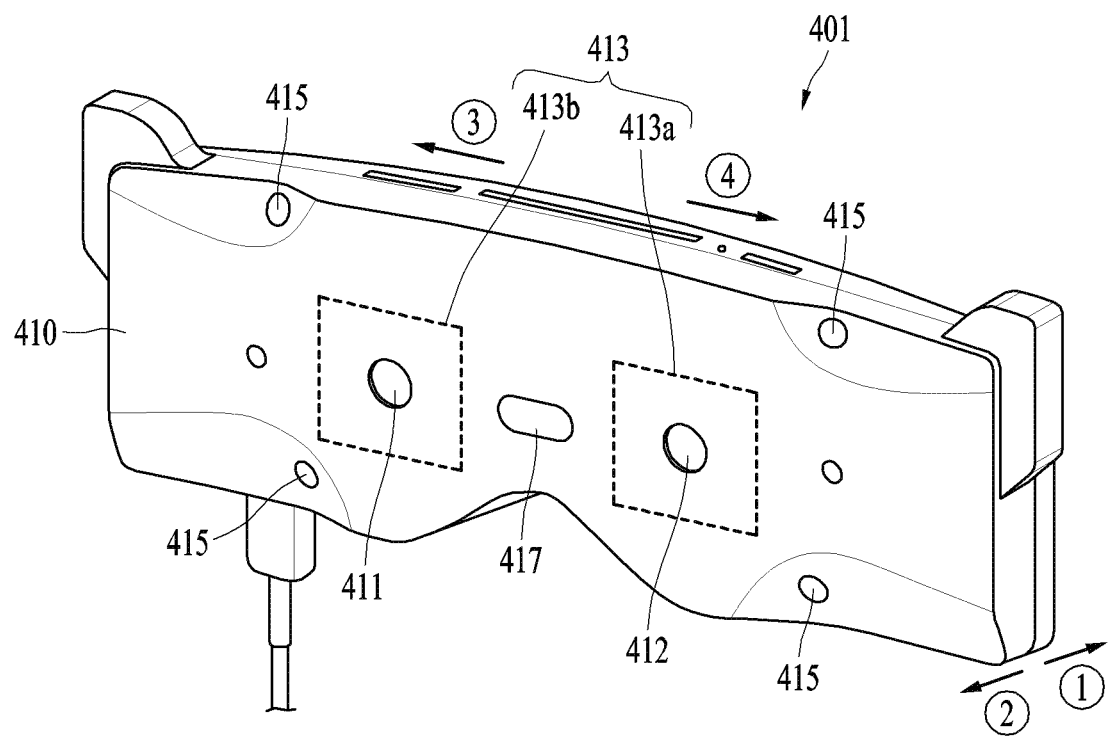
FIGS. 4A and 4B are diagrams illustrating examples of a front view and a rear view of an electronic device according to various embodiments of the disclosure.
Figure 4B:
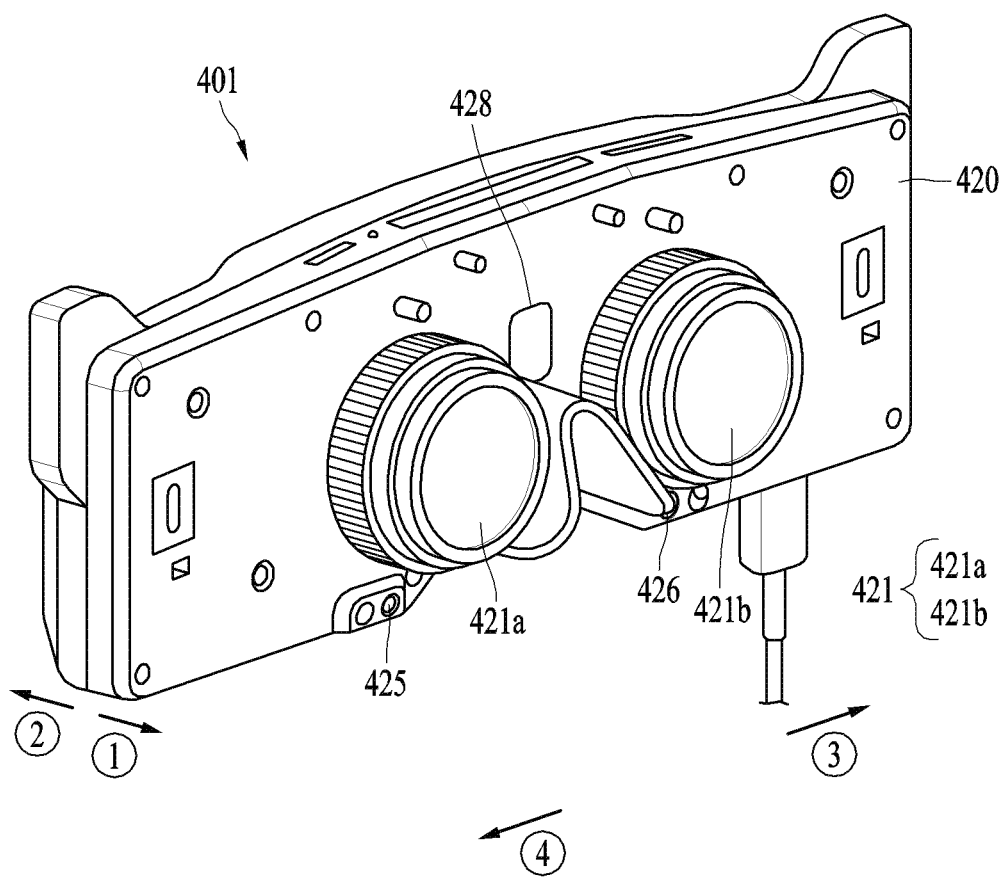

FIGS. 4A and 4B are diagrams illustrating examples of a front view and a rear view of an electronic device according to various embodiments of the disclosure.

FIG. 4A shows an outward form of an electronic device 401 viewed in a first direction (①), and FIG. 4B shows an outward form of the electronic device 401 viewed in a second direction (②). When a user wears the electronic device 401, an outward form viewed by the eyes of the user may be the one shown in FIG. 4B.

Referring to FIG. 4A, according to various embodiments, the electronic device 401 (e.g., the electronic device 101 of FIG. 1, the electronic device 201 of FIG. 2, or the electronic device 301 of FIG. 3) may provide a service providing an extended reality (XR) experience to the user. For example, XR or XR service is defined as a service that collectively refers to virtual reality (VR), AR, and/or mixed reality (MR).

According to an embodiment, the electronic device 401 may refer to a head-mounted device or head-mounted display (HMD) worn on a head of the user but may be provided in the form of at least one of glasses, goggles, a helmet, or a hat. The electronic device 401 may include some types such as an OST type configured such that, when being worn, external light reaches the eyes of the user through glasses or a video see-through (VST) type configured such that, when being worn, light emitted from a display reaches the eyes of the user but external light is blocked not to reach the eyes of the user.

According to an embodiment, the electronic device 401 may be worn on the head of the user and provide images related to an XR service to the user. For example, the electronic device 401 provides XR content (hereinafter also referred to as an XR content image) output such that at least one virtual object is visible overlapping in a display region or a region determined as a field of view (FoV) of the user. According to an embodiment, the XR content may refer to an image related to a real space obtained through a camera (e.g., an image capturing camera) or an image or video in which at least one virtual object is added to a virtual space. According to an embodiment, the electronic device 401 may provide XR content based on a function being performed by the electronic device 401 and/or a function being performed by at least one or more external electronic devices of external electronic devices (e.g., the electronic devices 102 and 104 of FIG. 1 and the server 108 of FIG. 1).

According to an embodiment, the electronic device 401 may be at least partially controlled by an external electronic device (e.g., the electronic device 102 or 104 of FIG. 1), or may perform at least one function under the control of the external electronic device or perform at least one function independently.

Referring to FIG. 4A, a vision sensor may be disposed on a first surface of a housing of a main body 410 of the electronic device 401. The vision sensor may include cameras (e.g., second function cameras 411 and 412, and first function cameras 415) and/or a depth sensor 417 for obtaining information related to a surrounding environment of the electronic device 401.

In an embodiment, the second function cameras 411 and 412 may obtain images related to the surrounding environment of the electronic device 401. With a wearable electronic device worn by the user, the first function cameras 415 may obtain images. The first function cameras 415 may be used for hand detection and tracking, and recognition of gestures (e.g., hand gestures) of the user. The first function cameras 415 may be used for 3DoF and 6DoF head tracking, position (space, environment) recognition, and/or movement recognition. In an embodiment, the second function cameras 411 and 412 may also be used for hand detection and tracking, and the recognition of user gestures.

In an embodiment, the depth sensor 417 may be configured to transmit a signal and receive a signal reflected from an object, and may be used to determine a distance to the object based on a TOF. Alternatively of or additionally, the cameras 411, 412, and 415 may determine the distance to the object in place of the depth sensor 417.

Referring to FIG. 4B, face recognition cameras 425 and 426 and/or a display 421 (and/or a lens) may be disposed on a second surface 420 of the housing of the main body 410.

In an embodiment, the face recognition cameras 425 and 426 adjacent to a display may be used to recognize a face of the user or may recognize and/or track both eyes of the user.

In an embodiment, the display 421 (and/or a lens) may be disposed on the second surface 420 of the electronic device 401. In an embodiment, the electronic device 401 may not include some of the plurality of cameras 415. Although not shown in FIGS. 4A and 4B, the electronic device 401 may further include at least one of the components shown in FIG. 2.

According to an embodiment, the electronic device 401 may include the main body 410 on which at least some of the components of FIG. 1 are mounted, the display 421 (e.g., the display module 160 of FIG. 1) disposed in the first direction ① of the main body 410, the first function camera 415 (e.g., a recognition camera) disposed in the second direction ② of the main body 410, the second function cameras 411 and 412 (e.g., image capturing cameras) disposed in the second direction ②, a third function camera 428 (e.g., an ET camera) disposed in the first direction ①, fourth function cameras 425 and 426 (e.g., face recognition cameras) disposed in the first direction ①, the depth sensor 417 disposed in the second direction ②, and a touch sensor 413 disposed in the second direction ②. Although not shown in the drawings, the main body 410 may include memory (e.g., the memory 130 of FIG. 1) and a processor (e.g., the processor 120 of FIG. 1) therein, and may further include other components shown in FIG. 1.

According to an embodiment, the display 421 may include an LCD, a DMD, a LCoS device, an OLED, or a micro-LED.

In an embodiment, when the display 421 is one of an LCD, a DMD, or an LCoS device, the electronic device 401 may include a light source that emits light to a screen output area of the display 421. In another embodiment, when the display 421 is capable of generating light by itself, for example, when the electronic device 401 is formed of one of an OLED or a micro-LED, the electronic device 401 provides an XR content image with a relatively high quality to the user, even though a separate light source is not included. In an embodiment, when the display 421 is implemented as an OLED or a micro-LED, a light source may be unnecessary, which may lead to lightening of the electronic device 401.

According to an embodiment, the display 421 may include a first transparent member 421a and/or a second transparent member 421b. The user may use the electronic device 401 with it worn on the face. The first transparent member 421a and/or the second transparent member 421b may be formed of a glass plate, a plastic plate, or a polymer, and may be transparently or translucently formed. According to an embodiment, the first transparent member 421a may be disposed to face a left eye of the user in a fourth direction ④, and the second transparent member 421b may be disposed to face a right eye of the user in a third direction ③. According to various embodiments, when the display 421 is transparent, the display 421 may be disposed at a position facing the eyes of the user to form a display region.

According to an embodiment, the display 421 may include a lens including a transparent waveguide. The lens may serve to adjust the focus such that a screen (e.g., an XR content image) output to the display 421 is to be viewed by the eyes of the user. For example, light emitted from a display panel passes through the lens and be transmitted to the user through the waveguide formed within the lens. The lens may include, for example, a Fresnel lens, a pancake lens, or a multichannel lens.

An optical waveguide (e.g., a waveguide) may serve to transmit a light source generated by the display 421 to the eyes of the user. The optical waveguide may be formed of glass, plastic, or a polymer, and may have a nanopattern formed on a portion of an inner or outer surface, for example, a grating structure of a polygonal or curved shape. According to an embodiment, light incident to one end of the optical waveguide, that is, an output image of the display 421 may be propagated inside the optical waveguide to be provided to the user. In addition, the optical waveguide formed of a free-form prism may provide the incident light to the user through a reflection mirror. The optical waveguide may include at least one of diffraction elements (e.g., a diffractive optical element (DOE) and a holographic optical element (HOE)) or at least one of reflective elements (e.g., a reflection mirror). The optical waveguide may guide an image output from the display 421 to the eyes of the user using the at least one diffractive element or reflective element included in the optical waveguide.

According to an embodiment, the diffractive element may include an input optical member/output optical member (not shown). For example, the input optical member refers to an input grating region, and the output optical member (not shown) refers to an output grating region. The input grating region may serve as an input end that diffracts (or reflects) light output from a light source (e.g., a micro-LED) to transmit the light to a transparent member (e.g., the first transparent member 421a and the second transparent member 421b) of the display region. The output grating region may serve as an outlet that diffracts (or reflects) the light transmitted to the transparent member (e.g., the first transparent member and the second transparent member) of the optical waveguide to the eyes of the user.

According to an embodiment, the reflective element may include a TIR optical element or a TIR waveguide for TIR. For example, TIR, which is a scheme for guiding light, generates an angle of incidence such that light (e.g., a virtual image) input through the input grating region is to be reflected substantially 100% from one surface (e.g., a specific side) of the optical waveguide and the light is to be transmitted substantially 100% up to the output grating region.

In an embodiment, the light emitted from the display 421 may be guided to an optical path to the waveguide through the input optical member. The light traveling inside the optical waveguide may be guided toward the eyes of the user through the output optical member. The display region may be determined based on the light emitted in the direction of the eyes.

According to an embodiment, the electronic device 401 may include a plurality of cameras. For example, the cameras includes the first function camera 415 (e.g., a recognition camera) disposed in the second direction ② of the main body 410, the second function cameras 411 and 412 (e.g., image capturing cameras) disposed in the second direction ②, the third function camera 428 (e.g., an ET camera) disposed in the first direction ①, and the fourth function cameras 425 and 426 (e.g., face recognition cameras) disposed in the first direction ①, and may further include other function cameras (not shown).

The first function camera 415 (e.g., the recognition camera) may be used for a function of detecting a movement of the user or recognizing a gesture of the user. The first function camera 415 may support at least one of head tracking, hand detection and hand tracking, and space recognition. For example, the first function camera 415 mainly uses a GS camera having excellent performance compared to an RS camera to detect and track fine gestures or movements of hands and fingers, and is configured as a stereo camera including two or more GS cameras for head tracking and space recognition. The first function camera 415 may perform functions, such as, 6DoF space recognition, and a SLAM function for recognizing information (e.g., position and/or direction) associated with a surrounding space through depth imaging.

The second function cameras 411 and 412 (e.g., the image capturing cameras) may be used to capture images of the outside, generate an image or video corresponding to the outside, and transmit it to a processor (e.g., the processor 120 of FIG. 1). The processor may display the image provided from the second function cameras 411 and 412 on the display 421. The second function cameras 411 and 412 may also be referred to as an HR or PV camera and may include an HR camera. For example, the second function cameras 411 and 412 are color cameras equipped with a function for obtaining high-quality images, such as, an AF function and OIS, but are not limited thereto. The second function cameras 411 and 412 may also include a GS camera or an RS camera.

The third function camera 428 (e.g., the ET camera) may be disposed on the display 421 (or inside the main body) such that camera lenses face the eyes of the user when the user wears the electronic device 401. The third function camera 428 may be used for detecting and tracking the pupils (e.g., ET). The processor may verify a gaze direction by tracking movements of the left eye and the right eye of the user in an image received from the third function camera 428. By tracking positions of the pupils in the image, the processor may be configured such that the center of an XR content image displayed on the display region is positioned according to a direction in which the pupils are gazing. For example, the third function camera 428 uses a GS camera to detect the pupils and track the movements of the pupils. The third function camera 428 may be installed for each of the left eye and the right eye, and may have the same camera performance and specifications.

The fourth function cameras 425 and 426 (e.g., the face recognition cameras) may be used to detect and track a facial expression of the user (e.g., FT) when the user wears the electronic device 401.

According to an embodiment, the electronic device 401 may include a lighting unit (e.g., LED) (not shown) as an auxiliary means for cameras. For example, the third function camera 428 uses a lighting unit included in a display as an auxiliary means for facilitating gaze detection when tracking eye movements, to direct emitted light (e.g., IR LED of an IR wavelength) toward both eyes of the user. In another example, the second function cameras 411 and 412 may further include a lighting unit (e.g., a flash) as an auxiliary means for supplementing surrounding brightness when capturing an image of the outside.

According to an embodiment, the depth sensor 417 (or a depth camera) may be used to verify a distance to an object (e.g., a target) through, for example, TOF. TOF, which is a technology for measuring a distance to an object using a signal (e.g., near-infrared rays, ultrasound, or laser), may transmit a signal from a transmitter and then measure the signal by a receiver, and may measure a distance to an object based on a TOF of the signal.

According to an embodiment, the touch sensor 413 may be disposed in the second direction ② of the main body 410. For example, when the user wears the electronic device 401, the eyes of the user views in the first direction ① of the main body. The touch sensor 413 may be implemented as a single type or a left/right separated type based on the shape of the main body 410 but is not limited thereto. For example, in a case in which the touch sensor 413 is implemented as the left/right separated type as shown in FIG. 4A, when the user wears the electronic device 401, a first touch sensor 413*a* is disposed at a position corresponding to the left eye of the user in the fourth direction ④, and a second touch sensor 413*b* is disposed at a position corresponding to the right eye of the user in the third direction ③.

The touch sensor 413 may recognize a touch input using at least one of, for example, capacitive, resistive, infrared, or ultrasonic method. For example, the touch sensor 413 using the capacitive method recognizes a physical touch (or contact) input or hovering (or proximity) input of an external object. According to some embodiments, the electronic device 401 may use a proximity sensor (not shown) to recognize the proximity to an external object.

According to an embodiment, the touch sensor 413 may have a two-dimensional (2D) surface and transmit, to a processor (e.g., the processor 120 of FIG. 1), touch data (e.g., touch coordinates) of an external object (e.g., a finger of the user) contacting the touch sensor 413. The touch sensor 413 may detect a hovering input of an external object (e.g., a finger of the user) approaching within a first distance away from the touch sensor 413 or detect a touch input contacting the touch sensor 413.

In one embodiment, touch sensor 413 may provide two-dimensional information about the contact point to processor 120 as "touch data" when an external object touches touch sensor 413. The touch data may be described as a "touch mode." When the external object is positioned within the first distance from the touch sensor 413 (or hovers above a proximity or touch sensor), the touch sensor 413 may provide hovering data about a time point or position of the external object hovering around the touch sensor 413 to the processor 120. The hovering data may also be described as a "hovering mode/proximity mode."

According to an embodiment, the electronic device 401 may obtain the hovering data using at least one of the touch sensor 413, a proximity sensor (not shown), or/and the depth sensor 417 to generate information about a distance between the touch sensor 413 and an external object, a position, or a time point.

According to an embodiment, the main body 410 may include a processor (e.g., the processor 120 of FIG. 1) and memory (e.g., the memory 130 of FIG. 1) therein.

The memory 130 may store various instructions that may be executed by the processor. The instructions may include control instructions, such as arithmetic and logical operations, data movement, or input/output, which may be recognized by the processor. The memory may include volatile memory (e.g., the volatile memory 132 of FIG. 1) and non-volatile memory (e.g., the non-volatile memory 134 of FIG. 1) to store, temporarily or permanently, various pieces of data.

The processor may be operatively, functionally, and/or electrically connected to each of the components of the electronic device 401 to perform control and/or communication-related computation or data processing of each of the components. The operations performed by the processor may be stored in the memory and, when executed, may be executed by the instructions that cause the processor to operate.

Although there will be no limitation to the computation and data processing functions implemented by the processor on the electronic device 401, a series of operations related to an XR content service function will be described hereinafter. The operations of the processor to be described below may be performed by executing the instructions stored in the memory.

According to an embodiment, the processor may generate a virtual object based on virtual information based on image information. The processor may output a virtual object related to an XR service along with background spatial information through the display 421. For example, the processor obtains image information by capturing an image related to a real space corresponding to an FoV of the user wearing the electronic device 401 through the second function cameras 411 and 412, or generate a virtual space of a virtual environment. For example, the processor performs control to display, on the display 421, XR content (hereinafter, referred to as an XR content screen) that outputs at least one virtual object such that it is visible overlapping in a FoV area or an area determined as the FoV of the user.

According to an embodiment, the electronic device 401 may have a form factor to be worn on the head of the user. The electronic device 401 may further include a strap and/or a wearing member to be fixed on a body part of the user. The electronic device 401 may provide a VR, AR, and/or MR-based user experience while worn on the head of the user.

Figure 5:
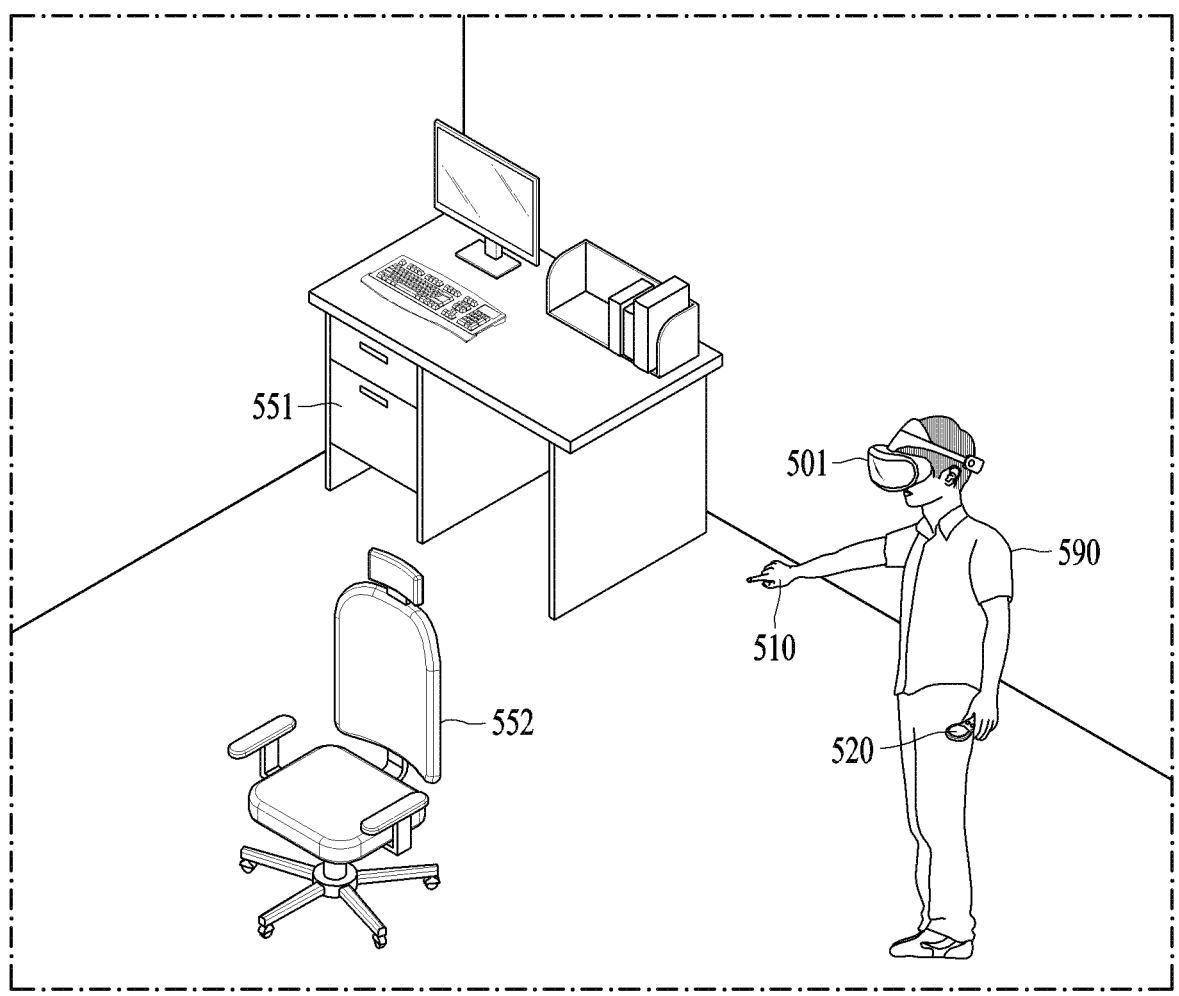
FIG. 5 illustrates an example of construction of a virtual space and input from and output to a user in a virtual space according to an embodiment of the disclosure.

FIG. 5 illustrates an example of construction of a virtual space and input from and output to a user in a virtual space according to an embodiment of the disclosure.

Referring to FIG. 5, an electronic device 501 (e.g., the electronic device 101 of FIG. 1, the electronic device 201 of FIG. 2, the electronic device 301 of FIG. 3, or the electronic device 401 of FIGS. 4A and 4B) may obtain spatial information about a physical space in which sensors are located using the sensors. The spatial information may include a geographic location of the physical space in which the sensors are located, a size of the space, an appearance of the space, a position of a physical object 551 disposed in the space, a size of the physical object 551, an appearance of the physical object 551, and illuminant information. The appearance of the space and the physical object 551 may include at least one of a shape, a texture, or a color of the space and the physical object 551. The illuminant information, which is information about a light source that emits light acting in the physical space, may include at least one of an intensity, a direction, or a color of illumination. The sensors described above may collect information for providing AR. For example, in an AR device shown in FIGS. 2, 3, 4A, and 4B, the sensors include a camera and a depth sensor. However, the sensors are not limited thereto, and the sensors may further include at least one of an infrared sensor, a depth sensor (e.g., a light detection and ranging (lidar) sensor, a radio detection and ranging (radar) sensor, or a stereo camera), a gyro sensor, an acceleration sensor, or a geomagnetic sensor.

The electronic device 501 may collect the spatial information over a plurality of time frames. For example, in each time frame, the electronic device 501 collects information about a space of a portion belonging to a scene within a sensing range (e.g., a FoV) of a sensor at a position of the electronic device 501 in the physical space. The electronic device 501 may analyze the spatial information of the time frames to track a change (e.g., a position movement or state change) of an object over time. The electronic device 501 may integrally analyze the spatial information collected through the plurality of sensors to obtain integrated spatial information (e.g., an image obtained by spatially stitching scenes around the electronic device 501 in the physical space) of an integrated sensing range of the plurality of sensors.

The electronic device 501 may analyze the physical space as three-dimensional (3D) information, using various input signals (e.g., sensing data of a red green blue (RGB) camera, an infrared sensor, a depth sensor, or a stereo camera) of the sensors. For example, the electronic device 501 analyzes at least one of the shape, the size, or the position of the physical space, and the shape, the size, or the position of the physical object 551.

For example, the electronic device 501 detects an object captured in a scene corresponding to an FoV of a camera, using sensing data (e.g., a captured image) of the camera. The electronic device 501 may determine a label of the physical object 551 (e.g., as information indicating classification of an object, including values indicating a chair, a monitor, or a plant) from a 2D scene image of the camera and an area (e.g., a bounding box) occupied by the physical object 551 in the 2D scene. Accordingly, the electronic device 501 may obtain 2D scene information from a position at which a user 590 is viewing. In addition, the electronic device 501 may also calculate a position of the electronic device 501 in the physical space based on the sensing data of the camera.

The electronic device 501 may obtain position information of the user 590 and depth information of a real space in a viewing direction, using sensing data (e.g., depth data) of a depth sensor. The depth information, which is information indicating a distance from the depth sensor to each point, may be expressed in the form of a depth map. The electronic device 501 may analyze a distance in the unit of each pixel at a 3D position at which the user 590 is viewing.

The electronic device 501 may obtain information including a 3D point cloud and mesh using various pieces of sensing data. The electronic device 501 may obtain a plane, a mesh, or a 3D coordinate point cluster that configures the space by analyzing the physical space. The electronic device 501 may obtain a 3D point cloud representing physical objects based on the information obtained as described above.

The electronic device 501 may obtain information including at least one of 3D position coordinates, 3D shapes, or 3D sizes (e.g., 3D bounding boxes) of the physical objects arranged in the physical space by analyzing the physical space.

Accordingly, the electronic device 501 may obtain physical object information detected in the 3D space and semantic segmentation information about the 3D space. The physical object information may include at least one of a position, an appearance (e.g., a shape, texture, and color), or a size of the physical object 551 in the 3D space. The semantic segmentation information, which is information obtained by semantically segmenting the 3D space into subspaces, includes, for example, information indicating that the 3D space is segmented into an object and a background and information indicating that the background is segmented into a wall, a floor, and a ceiling. As described above, the electronic device 501 may obtain and store 3D information (e.g., spatial information) about the physical object 551 and the physical space. The electronic device 501 may store 3D position information of the user 590 in the space, along with the spatial information.

The electronic device 501 may construct a virtual space 500 based on the physical positions of the electronic device 501 and/or the user 590. The electronic device 501 may generate the virtual space 500 by referring to the spatial information described above. The electronic device 501 may generate the virtual space 500 of substantially the same scale as the physical space based on the spatial information and arrange objects in the generated virtual space 500. The electronic device 501 may provide a complete VR to the user 590 by outputting an image that substitutes the entire physical space. The electronic device 501 may provide MR or AR by outputting an image that substitutes a portion of the physical space. Although the construction of the virtual space 500 based on the spatial information obtained by the analysis of the physical space has been described, the electronic device 501 may also construct the virtual space 500 irrespective of the physical position of the user 590. The virtual space 500 described herein may be a space corresponding to AR or VR and may also be referred to as a metaverse space.

For example, the electronic device 501 provides a virtual graphic representation that substitutes at least a partial space of the physical space. The electronic device 501, which is an OST-based electronic device, may output the virtual graphic representation overlaid on a screen area corresponding to at least a partial space of a screen display portion. The electronic device 501, which is a VST-based electronic device, may output an image generated by substituting an image area corresponding to at least a partial space in a space image corresponding to a physical space rendered based on the spatial information with a virtual graphic representation. The electronic device 501 may substitute at least a portion of a background in the physical space with a virtual graphic representation, but embodiments are not limited thereto. The electronic device 501 may only additionally arrange a virtual object 552 in the virtual space 500 based on the spatial information, without changing the background.

The electronic device 501 may arrange and output the virtual object 552 in the virtual space 500. The electronic device 501 may set a manipulation area for the virtual object 552 in a space occupied by the virtual object 552 (e.g., a volume corresponding to an appearance of the virtual object 552). The manipulation area may be an area in which a manipulation of the virtual object 552 occurs. In addition, the electronic device 501 may substitute the physical object 551 with the virtual object 552 and output the virtual object 552. The virtual object 552 corresponding to the physical object 551 may have the same or similar shape as or to the corresponding physical object 551. However, embodiments are not limited thereto, and the electronic device 501 may set only the manipulation area in a space occupied by the physical object 551 or at a position corresponding to the physical object 551, without outputting the virtual object 552 that substitutes the physical object 551. That is, the electronic device 501 may transmit, to the user 590, visual information representing the physical object 551 (e.g., light reflected from the physical object 551 or an image obtained by capturing the physical object 551) as it is without a change, and set the manipulation area in the corresponding physical object 551. The manipulation area may be set to have the same shape and volume as the space occupied by the virtual object 552 or the physical object 551, but is not limited thereto. The electronic device 501 may set the manipulation area that is smaller than the space occupied by the virtual object 552 or the space occupied by the physical object 551.

According to an example embodiment, the electronic device 501 may arrange a virtual object (not shown) (e.g., an avatar object) representing the user 590 in the virtual space 500. When the avatar object is provided in a first-person view, the electronic device 501 may provide a visualized graphic representation corresponding to a portion of the avatar object (e.g., a hand, a torso, or a leg) to the user 590 via the display described above (e.g., an OST display or a VST display). However, embodiments are not limited thereto, and when the avatar object is provided in a third-person view, the electronic device 501 may provide a visualized graphic representation corresponding to an entire shape (e.g., a back view) of the avatar object to the user 590 via the display described above. The electronic device 501 may provide the user 590 with an experience integrated with the avatar object.

In addition, the electronic device 501 may provide, to the user 590, the experience integrated with the avatar object using an avatar object of another user who enters the same virtual space 500. The electronic device 501 may receive feedback information that is the same as or similar to feedback information (e.g., information based on at least one of visual sensation, auditory sensation, or tactile sensation) provided to another electronic device 501 entering the same virtual space 500. For example, when an object is arranged in a certain virtual space 500 and a plurality of users access the virtual space 500, respective electronic devices 501 of the plurality of users 590 receive feedback information (e.g., a graphic representation, a sound signal, or haptic feedback) of the same object arranged in the virtual space 500 and provide the feedback information to each user 590.

The electronic device 501 may detect an input to an avatar object of another electronic device 501 and may receive feedback information from the avatar object of the other electronic device 501. An exchange of inputs and feedback for each virtual space 500 may be performed by a server (e.g., the server 108 of FIG. 1). For example, the server (e.g., a server providing a metaverse space) transfers, to the users 590, inputs and feedback between the avatar object of the user 590 and an avatar object of another user 590. However, embodiments are not limited thereto, and the electronic device 501 may establish direct communication with another electronic device 501 to provide an input based on an avatar object or receive feedback, not via the server.

For example, based on detecting a user input that selects a manipulation area, the electronic device 501 determines that the physical object 551 corresponding to the selected manipulation area is selected by the user 590. An input of the user 590 may include at least one of a gesture input made by using a body part (e.g., a hand or eye), a motion input, an input made by using a separate VR accessory device, a voice input of the user, or a multi-modal input.

The gesture input may be an input corresponding to a gesture identified by tracking a body part 510 of the user 590 and includes, for example, an input indicating or selecting an object. The gesture input may include at least one of a gesture by which a body part (e.g., a hand) moves toward an object for a predetermined period of time or more, a gesture by which a body part (e.g., a finger, an eye, or a head) points at an object, or a gesture by which a body part and an object contact each other spatially. A gesture of pointing at an object with an eye may be identified based on ET. A gesture of pointing at an object with a head may be identified based on head tracking.

Tracking the body part 510 of the user 590 may be mainly performed based on a camera of the electronic device 501 but is not limited thereto. The electronic device 501 may track the body part 510 based on a cooperation of sensing data of a vision sensor (e.g., image data of a camera and depth data of a depth sensor) and information collected by accessory devices to be described below (e.g., controller tracking or finger tracking in a controller). Finger tracking may be performed by sensing a distance or contact between an individual finger and the controller based on a sensor (e.g., an infrared sensor) embedded in the controller.

VR accessory devices includes, for example, a ride-on device, a wearable device, a controller device 520, or other sensor-based devices. The ride-on device, which is a device operated by the user 590 riding thereon, includes, for example, at least one of a treadmill-type device or a chair-type device. The wearable device, which is a manipulation device worn on at least a part of the body of the user 590, includes, for example, at least one of a full body suit-type or a half body suit-type controller, a vest-type controller, a shoe-type controller, a bag-type controller, a glove-type controller (e.g., a haptic glove), or a face mask-type controller. The controller device 520 may include an input device (e.g., a stick-type controller or a firearm) manipulated by a hand, foot, toe, or other body parts 510.

The electronic device 501 may establish direct communication with an accessory device and track at least one of a position or motion of the accessory device, but embodiments are not limited thereto. The electronic device 501 may communicate with the accessory device via a base station for VR.

For example, the electronic device 501 determines that the virtual object 552 is selected, based on detecting an act of gazing at the virtual object 552 for a predetermined period of time or more through an eye gaze tracking technology described above. In another example, the electronic device 501 may recognize a gesture of pointing at the virtual object 552 through a hand tracking technology. The electronic device 501 may determine that the virtual object 552 is selected, based on that a direction in which a tracked hand points indicates the virtual object 552 for a predetermined period of time or more or that a hand of the user 590 contacts or enters an area occupied by the virtual object 552 in the virtual space 500.

The voice input of the user, which is an input corresponding to a user's voice obtained by the electronic device 501, is sensed by, for example, an input module (e.g., a microphone) (e.g., the input module 150 of FIG. 1) of the electronic device 501 or may include voice data received from an external electronic device of the electronic device 501. By analyzing the voice input of the user, the electronic device 501 may determine that the physical object 551 or the virtual object 552 is selected. For example, based on detecting a keyword indicating at least one of the physical object 551 or the virtual object 552 from the voice input of the user, the electronic device 501 determines that at least one of the physical object 551 or the virtual object 552 corresponding to the detected keyword is selected.

The electronic device 501 may provide feedback to be described below as a response to the input of the user 590 described above.

The feedback may include visual feedback, auditory feedback, tactile feedback, olfactory feedback, or gustatory feedback. The feedback may be rendered by the server 108, the electronic device 101, or the external electronic device 102 as described above with reference to FIG. 1.

The visual feedback may include an operation of outputting an image through the display (e.g., a transparent display or an opaque display) of the electronic device 501.

The auditory feedback may include an operation of outputting a sound through a speaker of the electronic device 501.

The tactile feedback may include force feedback that simulates a weight, a shape, a texture, a dimension, and dynamics. For example, the haptic glove includes a haptic element (e.g., an electric muscle) that simulates a sense of touch by tensing and relaxing the body of the user 590. The haptic element in the haptic glove may act as a tendon. The haptic glove may provide haptic feedback to the entire hand of the user 590. The electronic device 501 may provide feedback that represents a shape, a size, and stiffness of an object through the haptic glove. For example, the haptic glove generates a force that simulates a shape, a size, and stiffness of an object. The exoskeleton of the haptic glove (or a suit-type device) may include a sensor and a finger motion measurement device, may transfer a cable-pulling force (e.g., an electromagnetic, direct current (DC) motor-based, or pneumatic force) to fingers of the user 590, and may thereby transmit tactile information to the body. Hardware that provides such tactile feedback may include a sensor, an actuator, a power source, and a wireless transmission circuit. The haptic glove may operate by inflating and deflating an inflatable air bladder on a surface of the glove.

Based on an object in the virtual space 500 being selected, the electronic device 501 may provide feedback to the user 590. For example, the electronic device 501 outputs a graphic representation (e.g., a representation of highlighting the selected object) indicating the selected object through the display. For example, the electronic device 501 outputs a sound (e.g., a voice) notifying the selected object through a speaker. For example, the electronic device 501 transmits an electrical signal to a haptic supporting accessory device (e.g., the haptic glove) and thereby provides a haptic motion that simulates a tactile sensation of a corresponding object to the user 590.

Figure 6:
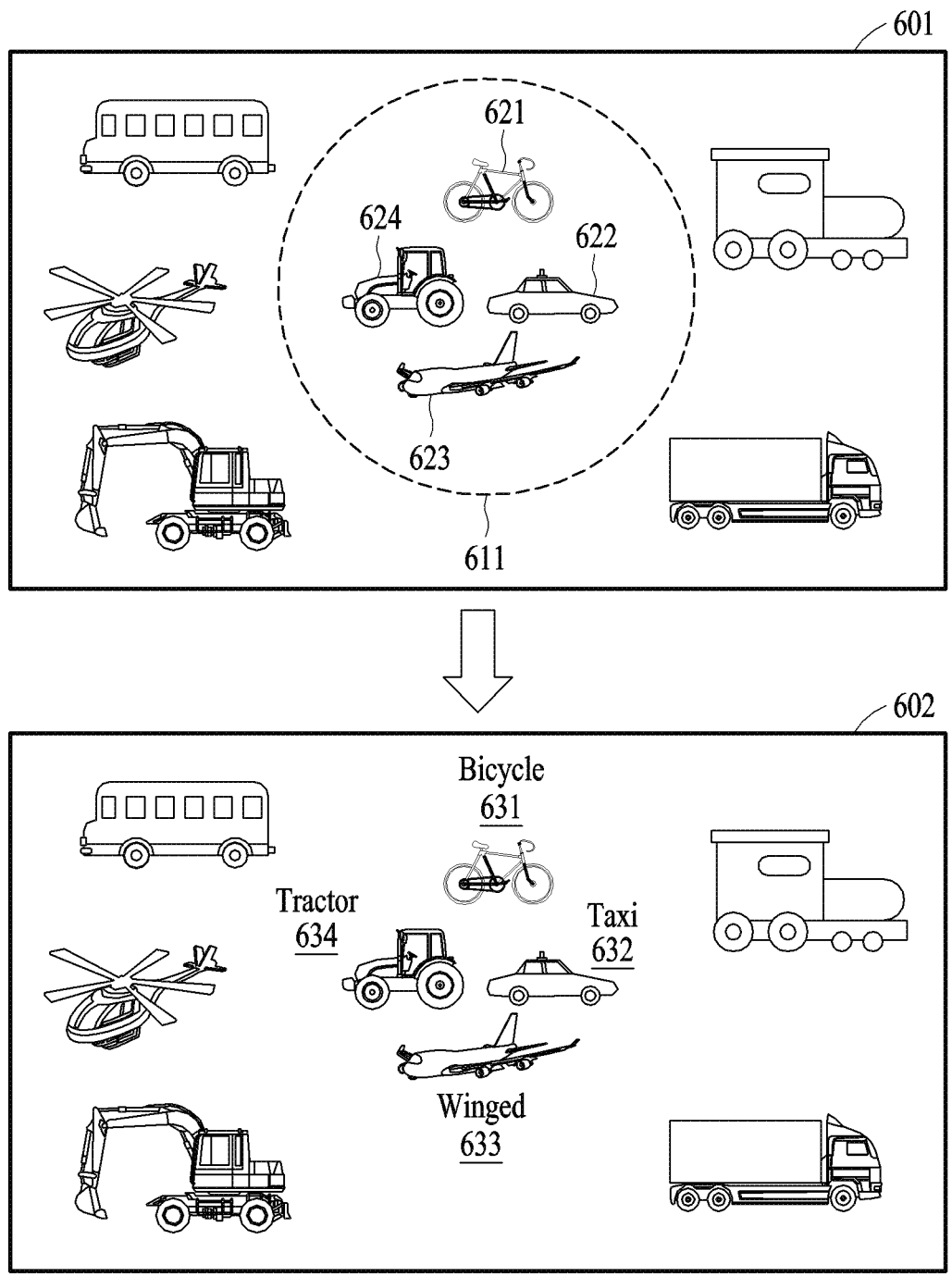
FIG. 6 is a diagram illustrating an example of an operation of determining an object indicated by a voice command according to an embodiment of the disclosure.

FIG. 6 is a diagram illustrating an example of an operation of determining an object indicated by a voice command according to an embodiment of the disclosure.

Referring to FIG. 6, an electronic device (e.g., the electronic device 101 of FIG. 1, the electronic device 201 of FIG. 2, the electronic device 301 of FIG. 3, the electronic device 401 of FIGS. 4A and 4B, or the electronic device 501 of FIG. 5) may be worn on the user.

The electronic device may display a display region (e.g., a first display region 601 and a second display region 602). The display region may refer to a region that is displayed through a display of the electronic device. According to an embodiment, the display region may include a region that is determined as a FoV of the user. The electronic device may determine, as the display region, a region that is determined as the FoV of the user in an image obtained through an image capturing camera (e.g., the third camera 245 of FIG. 2 or the second function cameras 411 and 412 of FIG. 4A), and display the determined display region through the display.

The electronic device may detect objects in the display region. According to an embodiment, the electronic device may detect objects in the display region by analyzing an image obtained through a vision sensor (e.g., a vision sensor including an image capturing camera). The objects may include physical objects and/or virtual objects.

The electronic device may obtain a voice command from the user. The electronic device may determine whether an object that is unclearly indicated in the voice command of the user is present. For example, the electronic device obtains a voice command of the user, "What's that?". The electronic device may determine that an object indicated by "that" in the voice command of the user is unclear.

The electronic device may detect candidate objects in a viewing region 611. The viewing region 611 may refer to a partial region gazed by the user among the region that is determined by the FoV of the user (or the display region). According to an embodiment, the viewing region 611 may be determined based on a gaze point corresponding to the gaze of the user. For example, the viewing region 611 is determined as a circular region with a radius that is predetermined based on the gaze point corresponding to the gaze of the user. When the viewing region 611 is determined as a circular region with a radius of a threshold length or less according to a design, it may be understood that the viewing region 611 substantially corresponds to the gaze point of the user. In another example, the viewing region 611 may be an internal region having an oval shape, a square shape, or a closed curve. However, the viewing region 611 is not limited to being determined based on the gaze of the user. According to an embodiment, the electronic device may determine a partial region that is predetermined based on the display region as the viewing region 611 of the user.

According to an embodiment, the electronic device may display at least portions of a plurality of candidate objects superimposed on each other. For example, at least a portion of one candidate object among the plurality of candidate objects is covered by another candidate object. In another example, one candidate object among the plurality of candidate objects may be transparent and visible in the same region as the other candidate objects. When a region in which the plurality of candidate objects are superimposed is detected in the viewing region, the electronic device may detect a plurality of candidate objects based on the superimposed region.

Referring to FIG. 6, the electronic device may detect candidate objects (e.g., a first candidate object 621, a second candidate object 622, a third candidate object 623, and a fourth candidate object 624) in the viewing region 611 of the first display region 601.

The electronic device may determine respective a representative property among candidate properties of the candidate objects, and output feedback based on a property value of the representative property of each candidate object for a corresponding candidate object. For example, as shown in FIG. 6, the electronic device determines a category among the candidate properties of the candidate objects as the representative property. The electronic device may, in a region corresponding to each candidate object in the second display region 602, display a property value of the category of the candidate object. The electronic device may display a first property value 631 (e.g., a bicycle) of a category of the first candidate object 621 in a region corresponding to the first candidate object 621, display a second property value 632 (e.g., a taxi) of a category of the second candidate object 622 in a region corresponding to the second candidate object 622, display a third property value 633 (e.g., an airplane) of a category of the third candidate object 623 in a region corresponding to the third candidate object 623, and display a fourth property value 634 (e.g., a tractor) of a category of the fourth candidate object 624 in a region corresponding to the fourth candidate object 624.

The electronic device may obtain an additional command from the user. The additional command may specify a property value of the representative property. The electronic device may determine an object indicated in the voice command based on the additional command. For example, the electronic device obtains the additional command of the user, "Yes, tractor." The electronic device may determine the object indicated in the voice command as the fourth candidate object 624 based on the additional command of the user.

Figure 7:
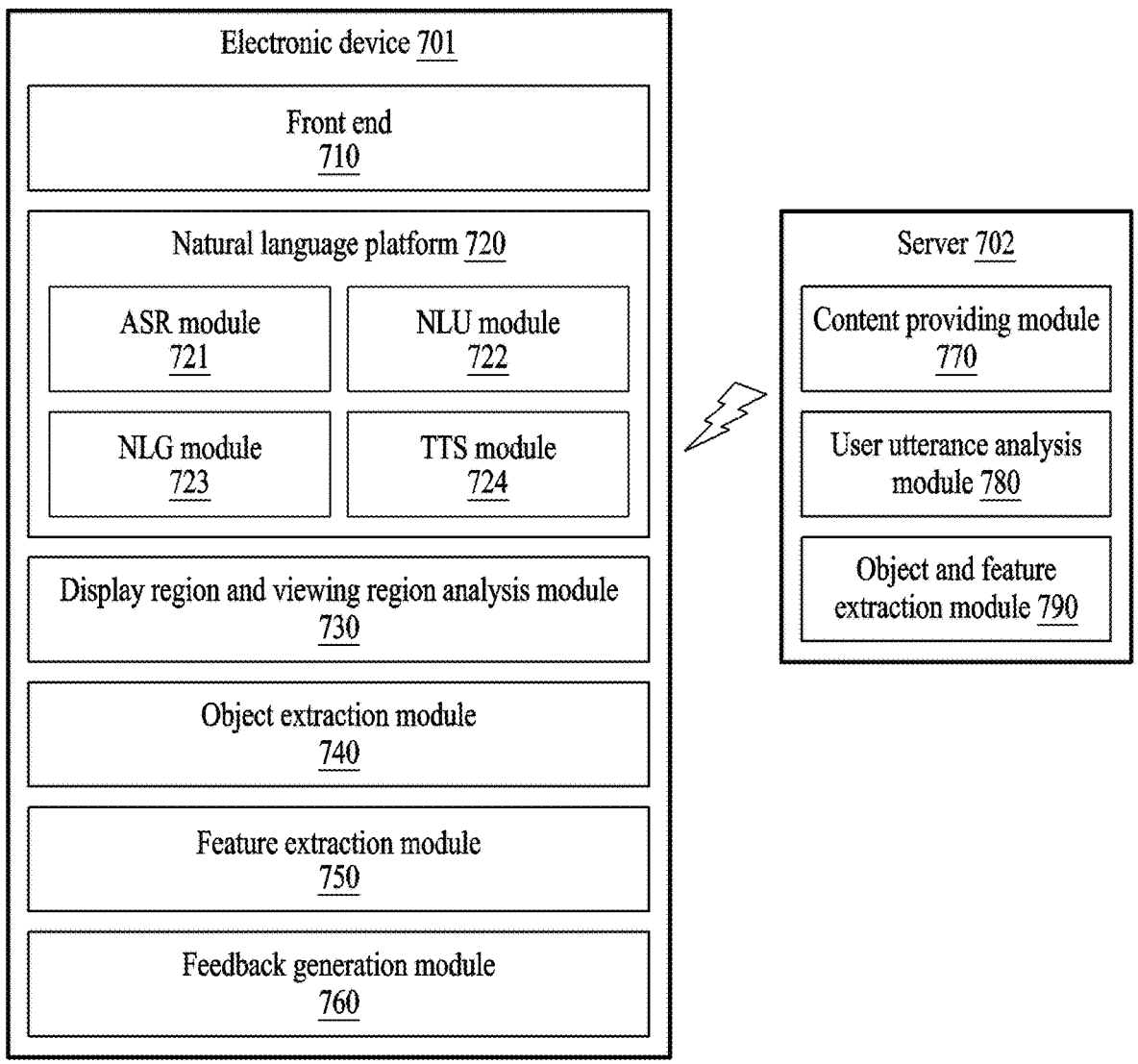
FIG. 7 is a diagram illustrating an example of an electronic device and a server according to an embodiment of the disclosure.

FIG. 7 is a diagram illustrating an example of an electronic device and a server according to an embodiment of the disclosure.

Referring to FIG. 7, in a metaverse system 700 according to an embodiment, in order to determine an object indicated in a voice input of the user, an electronic device 701 (e.g., the electronic device 101 of FIG. 1, the electronic device 201 of FIG. 2, the electronic device 301 of FIG. 3, the electronic device 401 of FIGS. 4A and 4B, or the electronic device 501 of FIG. 5) and/or a server 702 may extract candidate objects and/or properties of the candidate objects, and generate feedback.

The electronic device 701 may include at least one of a front end 710, a natural language platform 720, a display region and viewing region analysis module 730, an object extraction module 740, a feature extraction module 750, or a feedback generation module 760.

The front end 710 may receive a voice input from a user terminal. The front end 710 may transmit a response to the voice input.

According to an embodiment, the natural language platform 720 may include at least one of an automatic speech recognition (ASR) module 721, a natural language understanding (NLU) module 722, a natural language generator (NLG) module 723, or a text-to-speech (TTS) module 724.

The ASR module 721 may convert the voice input of the user into text data. The NLU module 722 may discern an intent of the user using the text data of the voice input. For example, the NLU module 722 discerns the intent of the user by performing syntactic analysis or semantic analysis. The NLU module 722 may discern the meaning of a word extracted from the voice input using a linguistic feature (e.g., a grammatical element) of a morpheme or phrase, and determine the intent of the user by matching the discerned meaning of the word to an intent. The NLG module 723 may change designated information into a text form. The information changed into the text form may be in the form of a natural language utterance. The TTS module 724 may change information in a text form into information in a speech form.

According to an embodiment, the natural language platform 720 may analyze the voice input of the user to determine that the object indicated in the voice input of the user is unclear. According to an embodiment, the natural language platform 720 may determine whether the object indicated in the voice input of the user is unclear based on the voice input of the user and the display region (or the viewing region). When the voice input of the user is analyzed independently of the display region (or the viewing region), the object indicated in the voice input of the user may unclear, however, when the voice input of the user is analyzed together with the display region (or the viewing region), the object indicated in the voice input of the user may be clear. For example, when the voice input of the user, "what's that?" is analyzed independently, an object indicated by "that" may be unclear. However, in a case where a single object is detected in the viewing region of the user, the single object detected in the viewing region of the user may be determined as the object indicated by "that", and the object indicated in the user input of the user may be determined to be clear.

The display region and viewing region analysis module 730 may determine a display region and/or a viewing region. The display region and viewing region analysis module 730 may determine the display region and/or the viewing region based on a result of tracking the gaze of the user. For example, when the natural language platform 720 determines that the object indicated in the voice input of the user is unclear, the display region and viewing region analysis module 730 determines the display region and/or the viewing region corresponding to a time point at which the voice input is obtained. In another example, the display region and viewing region analysis module 730 may determine the display region and/or the viewing region corresponding to the time point at which the voice input is obtained, and the natural language platform 720 may determine whether the object indicated in the voice input is unclear based on the determined display region and/or viewing region.

The object extraction module 740 may detect objects in at least a portion of the display region. According to an embodiment, the object extraction module 740 may detect objects in real time in the display region independently of the voice input of the user. When the object indicated in the voice input of the user is determined to be unclear, the object extraction module 740 may extract, as a candidate object, an object with at least a portion thereof in the display region among the detected objects. However, embodiments are not limited thereto, and the object extraction module 740 may extract candidate objects in the viewing region of the user based on the object indicated in the voice input of the user being determined to be unclear.

The feature extraction module 750 may determine the candidate properties and property values of the candidate properties, for the detected candidate object. For example, the feature extraction module 750 outputs feedback based on the candidate properties of the candidate object and the property values of the candidate properties by applying a machine learning model to input data corresponding to the candidate object. The input data corresponding to the candidate object may include at least one of image data obtained by capturing an image of a candidate object or metadata obtained by labeling a candidate object. The feature extraction module 750 may determine a representative property and/or a supplementary property for distinguishing between candidate objects, among the candidate properties of the candidate objects.

The feedback generation module 760 may provide feedback for each candidate object, such that the user recognizes a property value of the representative property and/or the supplementary property determined by the feature extraction module 750. For example, the feedback generation module 760 generates visual feedback (e.g., a graphic representation) that indicates the property value of the representative property and/or the supplementary property and/or display the generated visual feedback in a region corresponding to the candidate object. The feedback generation module 760 may generate, for the candidate object, auditory feedback (e.g., speech data) corresponding to the property value of the representative property and/or the supplementary property and/or reproduce the generated auditory feedback.

The electronic device 701 may operate together with the server 702 (e.g., the server 108 of FIG. 1) to determine additional properties and property values of the additional properties for the candidate object. For example, the electronic device 701 transfers a request for providing the additional property for the candidate objects to the server 702. The server 702 may receive the request for providing the additional property for the candidate objects from the electronic device 701. The request may include at least one of a voice input of the user, a display region, a viewing region, candidate objects, candidate properties, or property values of the candidate properties. Based on the request received from the electronic device 701, the server 702 may determine the additional properties of the candidate objects and the property values of the additional properties. The server 702 may transfer the additional properties of the candidate objects and the property values of the additional properties to the electronic device 701. The electronic device 701 may receive the additional properties of the candidate objects and the property values of the additional properties from the server 702. The electronic device 701 may determine a representative property among the candidate properties and the additional properties, output feedback based on a property value of the representative property, and determine an object indicated in a voice command among the candidate objects based on an additional command of the user.

According to an embodiment, the server 702 may include at least one of a content providing module 770, a user utterance analysis module 780, or an object and feature extraction module 790.

The content providing module 770 may store in advance information about a plurality of objects (e.g., additional properties and property values of the additional properties) and/or feedback for the plurality of objects (e.g., visual feedback or auditory feedback for a property value of an additional property). The content providing module 770 may output information about a candidate object and/or feedback for the candidate object stored by the content providing module 770, based on the candidate object corresponding to one of the plurality of objects. According to an embodiment, when the content providing module 770 stores the information and/or feedback for the candidate object in advance, an operation of determining an additional property and additional property values by the object and feature extraction module 790 may be skipped for the corresponding candidate object.

The user utterance analysis module 780 may discern (or determine) an intent of the user by analyzing a voice input of the user received from the electronic device 701. The user utterance analysis module 780 performs an operation that is the same as or similar to the operation of the natural language platform 720 of the electronic device 701, however, the user utterance analysis module 780 may more specifically determine the intent of the user than the natural language platform 720 by using a larger model than a model used in the natural language platform 720.

The object and feature extraction module 790 may detect a candidate object and/or determine additional properties of the detected candidate object and property values of the additional properties. The user utterance analysis module 780 performs an operation that is the same or similar to the operation of the object extraction module 740 and/or the feature extraction module 750 of the electronic device 701, however, the user utterance analysis module 780 may more specifically determine the property and the property value of the candidate object than the object extraction module 740 and/or the feature extraction module 750 of the electronic device 701, by using a larger model than a model used in the object extraction module 740 and/or the feature extraction module 750 of the electronic device 701. In addition, the object and feature extraction module 790 may provide an additional property, even in a case where the candidate object is different from the object stored by the content providing module 770.

An example of an embodiment in which the electronic device 701 requests the additional property and the property value of the additional property from the server 702 will be described in more detail below with reference to FIG. 13.

Figure 8:
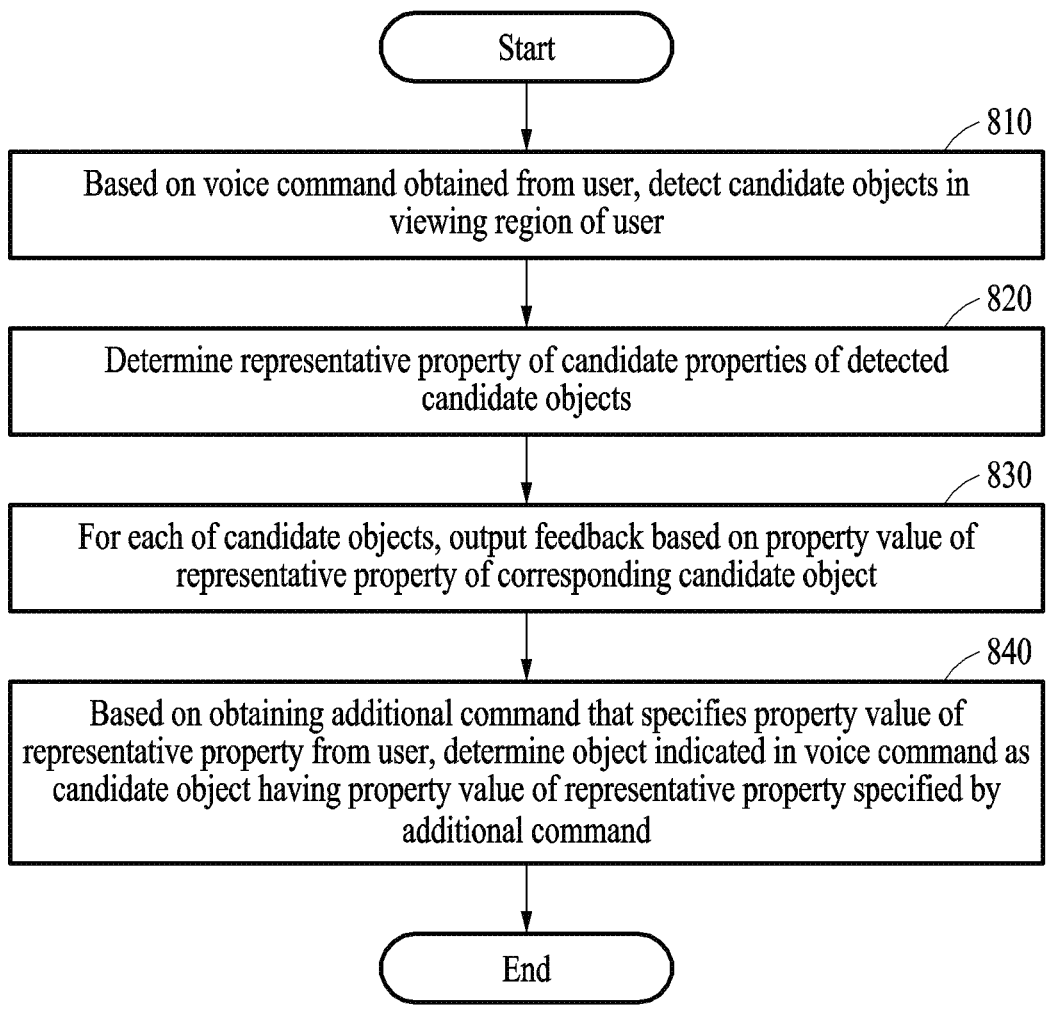
FIG. 8 is a diagram illustrating an example of a method of determining an object indicated by a voice command by an electronic device according to an embodiment of the disclosure.

FIG. 8 is a diagram illustrating an example of a method of determining an object indicated by a voice command by an electronic device according to an embodiment of the disclosure.

Referring to FIG. 8, an electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7) according to an embodiment may, in order to determine an object indicated in a voice command obtained from the user, determine a representative property among candidate properties of candidate objects, output feedback based on a property value of the representative property, and determine an object indicated in the voice command among the candidate objects based on an additional command of the user.

In operation 810, based on the voice command obtained from the user, the electronic device may detect the candidate objects in a viewing region of the user.

According to an embodiment, the electronic device may determine whether the object indicated in the voice command obtained from the user is specified. Based on the object indicated in the voice command not being specified, the electronic device may determine the candidate objects in the viewing region.

According to an embodiment, the electronic device may determine whether the candidate objects are detected based on a pronoun. For example, the electronic device determines whether the object is indicated using a pronoun in a voice command. Based on the object being indicated by using the pronoun in the voice command, the electronic device may detect the candidate objects of the object indicated by the pronoun.

According to an embodiment, the electronic device may determine the candidate objects based on a condition extracted from the voice command. For example, the electronic device extracts the condition for the object from the voice command. The electronic device may detect the candidate objects in the viewing region based on the extracted condition.

For example, the electronic device obtains a voice command, "What's that yellow thing?". The electronic device may extract the condition for a color (e.g., yellow) based on the voice command. The electronic device may detect a candidate object based on the condition for the color among the plurality of objects detected in the viewing region. For example, in a case where colors of a first object, a second object, a third object, and a fourth object detected in the viewing region are red, yellow, yellow, and blue, respectively, the second object and the third object are detected as the candidate objects.

For example, the electronic device obtains a voice command, "What is this thing like a washing machine?". In a case of household appliances, since products with similar appearance are produced across several categories, the electronic device may extract a condition in which a category of an object has a property value having a difference less than or equal to a threshold from the washing machine, rather than extracting a condition in which the category of the object is the washing machine. The electronic device may extract the condition for the category (e.g., the property value has a difference less than or equal to the threshold from the "washing machine") based on the voice command.

The electronic device may detect a first object (e.g., a washing machine), a second object (e.g., a clothes dryer), and a third object (e.g., a mobile phone) in the viewing region. Based on a property value of a category of the first object (e.g., the washing machine) having a difference less than or equal to the threshold from a property value of a category of the second object (e.g., the clothes dryer), the electronic device may detect the first object and the second object as candidate objects.

Although not explicitly shown in FIG. 8, based on detecting a single candidate object, the electronic device may determine the detected single candidate object as the object indicated in the voice command. Based on detecting the single candidate object, the electronic device may skip operations 820, 830, and 840.

In operation 820, the electronic device may determine the representative property of the candidate properties of the detected candidate objects.

A property may represent an individual item that classifies information related to a feature of an object. For example, the property includes at least one of a category of an object, a color of an object, a position of an object in a display region (or a viewing region), a shape of an object (e.g., with or without wings, or with or without wheels), a size of an object, a pattern of an object, a texture of an object, a country of origin, a material, a production year, an expiration date, or an owner of an object.

The electronic device may determine property values of candidate properties of the detected candidate objects. The electronic device may, for the candidate objects, determine the property value for each of the properties. For example, the electronic device uses the properties of the candidate objects as the candidate properties as they are. In another example, the electronic device may determine some of the properties of the candidate objects as the candidate properties.

According to an embodiment, the electronic device may exclude a property in which the property values of the candidate objects have a difference less than or equal to a threshold, from the candidate properties. For example, the electronic device determines the property values of the candidate objects with respect to the property. The electronic device may determine differences between two property values among the property values of the candidate objects. When all the determined differences are less than or equal to the threshold, the electronic device may exclude a corresponding property from the candidate properties. When a difference between property values of candidate objects for a specific property is less than or equal to the threshold, the electronic device may determine that it is not easy to use the specific property when specifying one of the candidate objects, and exclude the specific property from the candidate properties. For example, when colors of property values between the candidate objects are similar to each other, the electronic device excludes the color from the candidate properties.

When the property is numerical, a difference between property values may be defined as an absolute value of a value obtained by subtracting a second property value from a first property value. When the property is a matrix (or a vector) including a plurality of elements, a difference between property values may be defined as a value obtained by calculating absolute values of a value obtained by subtracting an element of a second property value corresponding to each of elements of a first property value and summing the calculated absolute values. For example, when the property is a color, a property value is a matrix (or a vector) including a red value (an R value) as a first element, a green value (a G value) as a second element, and/or a blue value (a B value) as a third element according to an RGB color model. A difference between a first property value and a second property value of the color may be defined as a sum of absolute values of differences between corresponding elements.

When the property is categorical, a difference between two property values among possible property values may be predetermined. Alternatively, when the property is categorical, an embedding vector extracted based on a vector extraction model (e.g., a machine learning model) for each of property values may be extracted, and a difference between the extracted embedding vectors may be calculated for two property values.

According to an embodiment, the electronic device may determine a representative property of the candidate properties based on a distribution of the property values of the candidate properties of the candidate objects for each candidate property. The electronic device may determine, as the representative property, a candidate property that is easily used to specify one of the candidate objects among the candidate properties. For example, the electronic device determines, as the representative property, a candidate property having a largest variance of property values of the candidate objects among the candidate properties.

However, the representative property is not limited to being determined as one common property for the candidate objects. The electronic device may determine the representative property for each of the candidate objects. For example, the electronic device determines a representative property of a first candidate object as a first property, and a representative property of a second candidate object as a second property. An operation of determining the representative property for each of the candidate objects will be described below with reference to FIG. 9.

In operation 830, the electronic device may output feedback for each of the candidate objects based on a property value of the representative property of a corresponding candidate object.

For example, the electronic device, in a region corresponding to each candidate object, displays visual feedback (e.g., a graphic representation) corresponding to the property value of the representative property of the corresponding candidate object. The visual feedback may include a graphic representation that highlights a property value of a representative property, and/or a text describing a property value of a representative property.

For example, the electronic device, for each of the candidate objects, reproduces auditory feedback (e.g., a voice output) corresponding to the property value of the representative property of the corresponding candidate object. The auditory feedback may include a voice output generated from text data for the property values of the representative property of the candidate objects.

It is described herein that the feedback for the candidate object is mainly based on the property value of the representative property, however, embodiments are not limited thereto. The electronic device may output, for each of the candidate objects, an indication determined independently of the property value of the representative property. For example, the electronic device outputs an indicator corresponding to a number allocated for each of the candidate objects.

In operation 840, based on obtaining an additional command that specifies the property value of the representative property from the user, the electronic device may determine the object indicated in the voice command as a candidate object having the property value of the representative property specified by the additional command.

The electronic device may obtain the additional command from the user. The user may transfer, based on the output feedback, the additional command that specifies the object indicated in the voice command among the candidate objects to the electronic device. The additional command may specify a property value of the representative property. For example, the representative property is color, a first property value of the representative property of the first candidate object is red, a second property value of the representative property of the second candidate object is blue, and a third property value of a representative property of a third candidate object is green. The electronic device may obtain an additional command, "The green one". The electronic device may determine that the additional command specifies the property value of the representative property (e.g., the color) as "green". The electronic device may determine the third candidate object among the first, second, and third candidate objects as the object indicated in the voice input based on the additional command.

Figure 9:
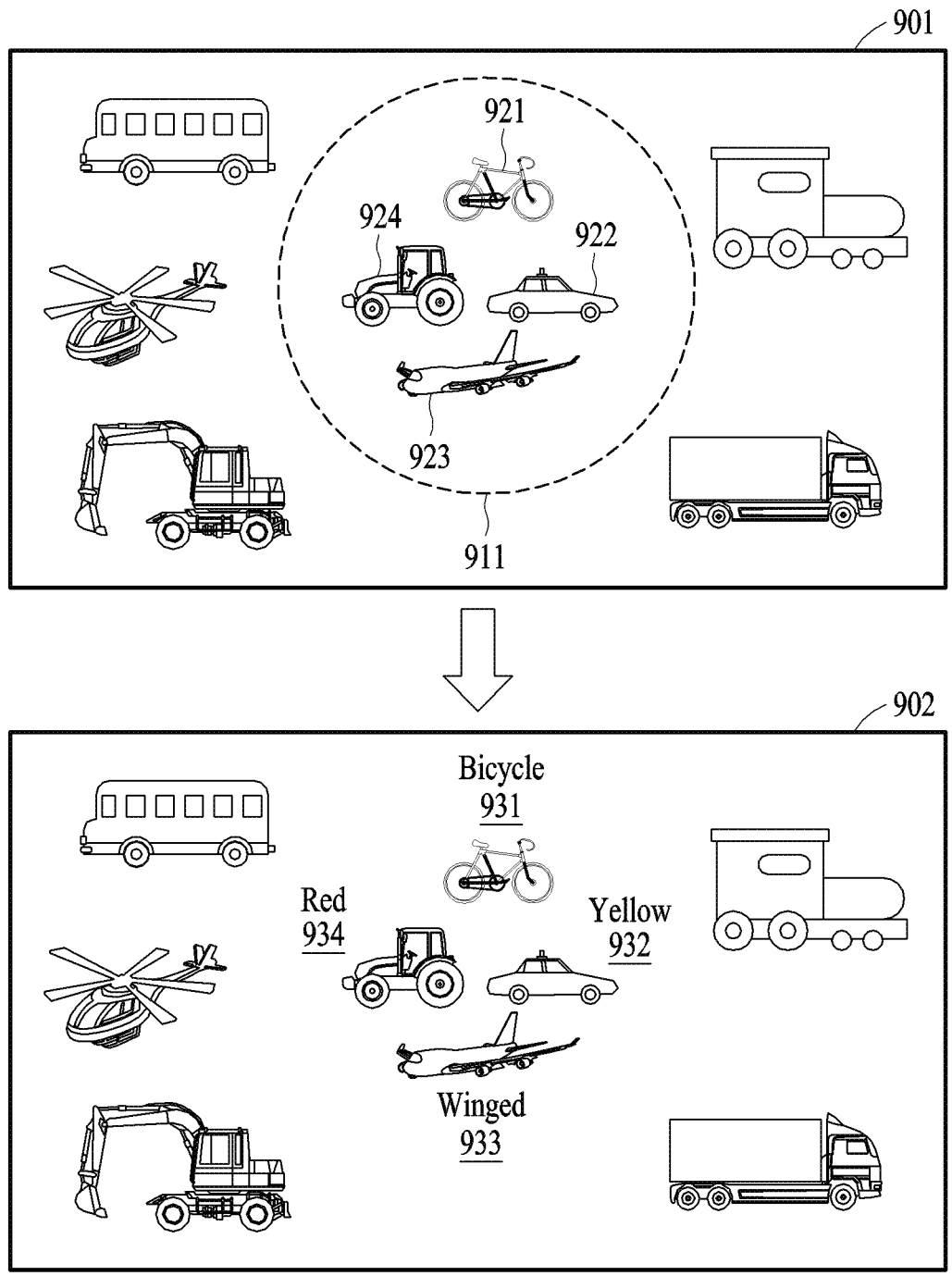
FIG. 9 is a diagram illustrating an example of an operation of determining a representative property for each of candidate objects according to an embodiment of the disclosure.

FIG. 9 is a diagram illustrating an example of an operation of determining a representative property for each of candidate objects according to an embodiment of the disclosure.

Referring to FIG. 9, an electronic device (the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7) according to an embodiment may determine a representative property for each of candidate objects, and output feedback based on a property value of the representative property determined for a corresponding candidate object.

The electronic device may detect a plurality of candidate objects (e.g., a first candidate object 921, a second candidate object 922, a third candidate object 923, and a fourth candidate object 924) in a viewing region 911 of the user of a first display region 901 based on a voice input of the user.

The electronic device may determine, for each of the candidate objects, a representative property of a corresponding candidate object based on a difference between a property value of the corresponding candidate object and property values of other candidate objects.

For a certain candidate object (e.g., the first candidate object 921), the electronic device may calculate a difference between a property value of the certain candidate object and each of property values of other candidate objects (e.g., the second candidate object 922, the third candidate object 923, and the fourth candidate object 924) among candidate properties. The electronic device may determine a property with a maximum difference among the calculated differences as a representative property of the certain candidate object. According to an embodiment, normalization may be performed in order to compare the calculated differences for a plurality of properties.

For example, the candidate properties includes a first candidate property (e.g., a color), a second candidate property (e.g., with or without wings), and a third candidate property (e.g., a category). Table 1 below shows an example of the property values of the candidate objects for each of candidate objects determined by the electronic device:

TABLE 1

|  | First candidate property (e.g., color) | Second candidate property (e.g., with or without wings) | Third candidate property (e.g., category) |
|---|---|---|---|
| First candidate object 921 | Sky blue | Without wings | Bicycle |
| Second candidate object 922 | Yellow | Without wings | Car |
| Third candidate object 923 | Sky blue | With wings | Airplane |
| Fourth candidate object 924 | Red | Without wings | Car |

The property value expressed in bold may represent a property value of a representative property of a candidate object corresponding to a corresponding row.

An example of an operation in which the electronic device determines the representative property for each candidate object will be described.

The electronic device may calculate a first difference between the property value (e.g., sky blue) of the first candidate property (e.g., the color) of the first candidate object 921, and the property values (e.g., yellow, sky blue, and red) of the other candidate objects. The electronic device may calculate a second difference between the property value (e.g., without wings) of the second candidate property (e.g., with or without wings) of the first candidate object 921, and property values (e.g., without wings, with wings, and without wings) of the other candidate objects. The electronic device may calculate a third difference between the property value (e.g., the bicycle) of the third candidate property (e.g., the category) of the first candidate object 921, and property values (e.g., car, airplane, and car) of the other candidate objects. The electronic device may normalize the first, second, and third differences, respectively, and determine the third candidate property (e.g., the category) as the representative property of the first candidate object 921 based on the third difference that is a largest difference among the normalized first, second, and third differences.

The electronic device may determine the candidate property that is different from the representative property of the first candidate object 921 among the candidate objects as a representative property of the second candidate object 922. For example, the electronic device determines the representative property of the second candidate object 922 as the first candidate property (e.g., the color). The electronic device may determine the representative property of the third candidate object 923 as the second candidate property (e.g., with or without wings). The electronic device may determine the representative property of the fourth candidate object as the first candidate property (e.g., the color).

The electronic device may output, for each of the candidate objects, feedback based on the property value of the representative property determined for the corresponding candidate object. For example, as shown in a second display region 902 of FIG. 9, the electronic device outputs first feedback 931 for the first candidate object 921 based on the property value (e.g., the bicycle) of the third candidate property (e.g., the category), which is the representative property of the first candidate object 921. The electronic device may output second feedback 932 for the second candidate object 922 based on the property value (e.g., yellow) of the first candidate property (e.g., the color), which is the representative property of the second candidate object 922. The electronic device may output third feedback 933 for the third candidate object 923 based on the property value (e.g., with wings) of the second candidate property (e.g., with or without wings), which is the representative property of the third candidate object 923. The electronic device may output fourth feedback 934 for the fourth candidate object 924 based on the property value (e.g., red) of the first candidate property (e.g., the color), which is the representative property of the fourth candidate object 924.

Figure 10:
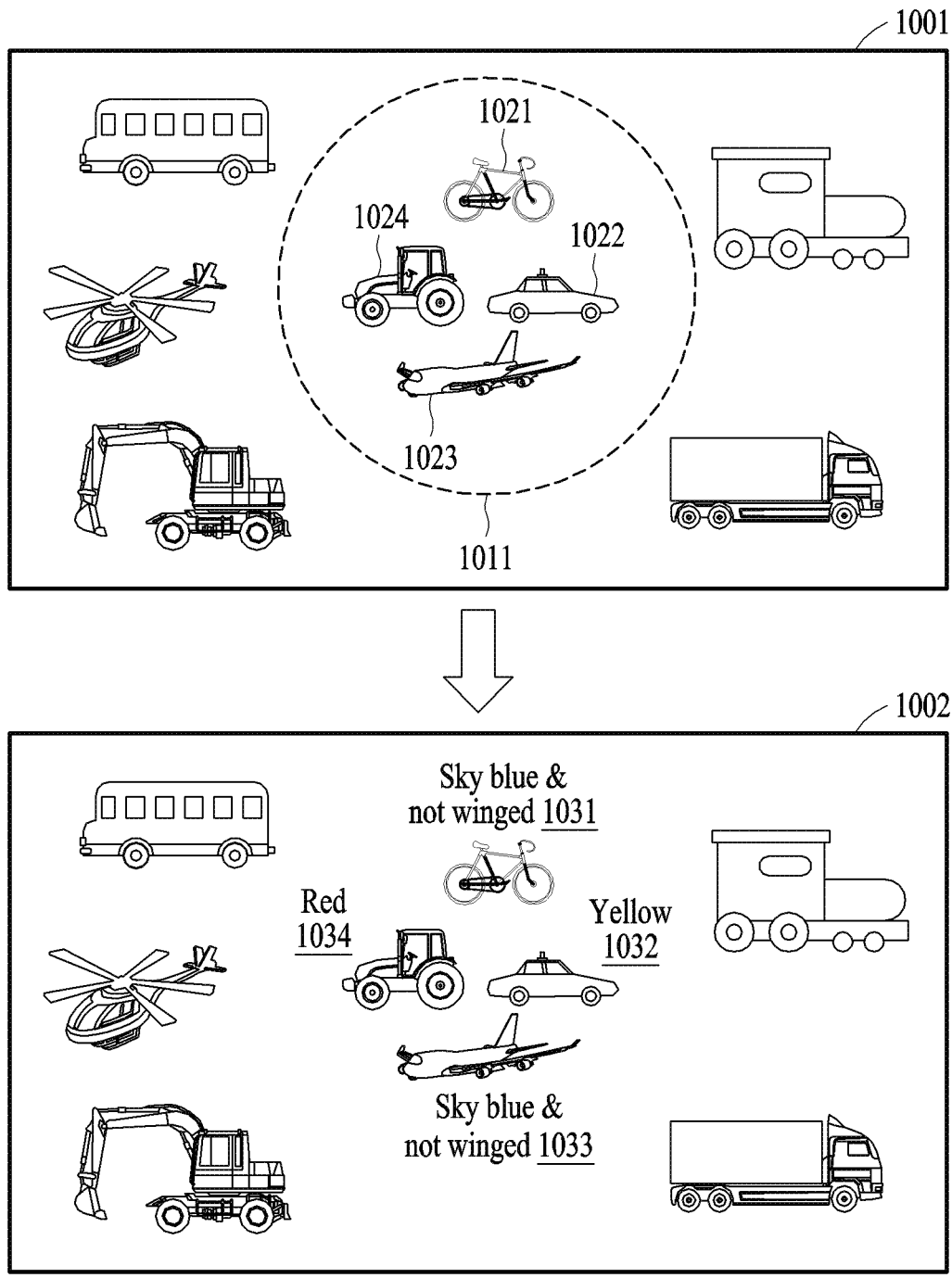
FIG. 10 is a diagram illustrating an example of an operation of outputting feedback based on a representative property and a supplementary property by an electronic device according to an embodiment of the disclosure.

FIG. 10 is a diagram illustrating an example of an operation of outputting feedback based on a representative property and a supplementary property by an electronic device according to an embodiment of the disclosure.

Referring to FIG. 10, when a common representative property between candidate objects is determined, and a difference between property values of the representative property of two or more candidate objects among the candidate objects is less than or equal to a threshold, an electronic device (the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7) according to an embodiment may determine a supplementary property to distinguish between the two or more candidate objects and/or output feedback based on the supplementary property.

The electronic device may detect a plurality of candidate objects (e.g., a first candidate object 1021, a second candidate object 1022, a third candidate object 1023, and a fourth candidate object 1024) in a viewing region 1011 of the user of a first display region 1001 based on a voice input of the user.

The electronic device may determine a representative property among candidate properties of the candidate objects. As described above with reference to FIG. 8, the electronic device may determine the representative property that is commonly applied to the candidate objects.

Referring to FIG. 10, the candidate properties may include a first candidate property (e.g., a color), a second candidate property (e.g., with or without wings), and a third candidate property (e.g., a category). Table 2 below shows an example of property values of the candidate objects for each of the candidate objects determined by the electronic device:

TABLE 2

|  | First candidate property (e.g., color) | Second candidate property (e.g., with or without wings) | Third candidate property (e.g., category) |
|---|---|---|---|
| First candidate object 1021 | Sky blue | Without wings | Bicycle |
| Second candidate object 1022 | Yellow | Without wings | Car |
| Third candidate object 1023 | Sky blue | With wings | Airplane |
| Fourth candidate object 1024 | Red | Without wings | Car |

The property value expressed in bold may represent property values of the common representative property of the plurality of candidate objects, and the property value expressed in italics may represent property values of a supplementary property.

An example of an operation in which the electronic device determines the common representative property of the candidate objects and determines the supplementary property will be described.

Referring to FIG. 10, the representative property of the plurality of candidate objects may be determined as the first candidate property (e.g., color).

Based on a difference between property values of the representative property of two or more candidate objects among the candidate objects being less than or equal to a threshold, the electronic device may determine the supplementary property of the two or more candidate objects (e.g., one candidate object and another candidate object). When the difference between the property values of the representative property of the one candidate object and the other candidate object is less than or equal to the threshold, it may be not easy to specify one of the one candidate object and the other candidate object only by the representative property. Therefore, the electronic device may determine the supplementary property to distinguish the one candidate object and the other candidate object, and use a property value of the supplementary property to generate feedback along with the representative property.

According to an embodiment, the electronic device may determine, for each of the candidate properties, the supplementary property among candidate properties different from the representative property, based on a difference between property values of two or more candidate objects (e.g., one candidate object and another candidate object). For example, the electronic device determines, as the secondary property, a property with a maxim difference between the property values of the one candidate object and the other candidate object. The electronic device may, instead of performing the determination based on a distribution of property values for all of the plurality candidate objects, perform the determination based on property values of the one candidate object and the other candidate object among the plurality of candidate objects, and may thus determine the supplementary property to distinguish the one candidate object and the other candidate object. Even when the property value of the supplementary property of the one candidate object is the same as or similar to the property value of the supplementary property of the other candidate object, the one candidate object may be distinguished from the other candidate object based on the supplementary property.

For example, in FIG. 10, the electronic device determines a supplementary property based on a difference between property values (e.g., sky blue and sky blue) of the representative property (e.g., color) of the first candidate object 1021 and the third candidate object 1023 being less than or equal to the threshold. The electronic device may determine a supplementary property of the first candidate object 1021 and the third candidate object 1023 among the second candidate property and the third candidate property different from the first candidate property, which is the representative property of the candidate properties. The electronic device may calculate a first difference between the property values of the second candidate property of the first candidate object 1021 and the third candidate object 1023 for the second candidate property. The electronic device may calculate a second difference between the property values of the third candidate property of the first candidate object 1021 and the third candidate object 1023 for the third candidate property. The electronic device may normalize the first difference and the second difference, and determine the second candidate property (e.g., with or without wings) as the supplementary property based on the first difference having a larger value among the normalized first difference and second difference.

For each of two or more candidate objects (e.g., one candidate object and another candidate object), the electronic device may output feedback based on the property value of the supplementary property of a corresponding candidate object, along with the property value of the representative property of the corresponding candidate object. For example, as shown in a second display region 1002 of FIG. 10, the electronic device outputs first feedback 1031 for the first candidate object 1021 based on the property value (e.g., sky blue) of the first candidate property (e.g., color), which is the representative property, and the property value (e.g., without wings) of the second candidate property (e.g., with or without wings), which is the supplementary property. The electronic device may output second feedback 1032 for the second candidate object 1022 based on the property value (e.g., yellow) of the first candidate property (e.g., the color), which is the representative property. The electronic device may output third feedback 1033 for the third candidate object 1023 based on the property value (e.g., sky blue) of the first candidate property (e.g., color), which is the representative property, and the property value (e.g., with wings) of the second candidate property (e.g., with or without wings), which is the supplementary property. The electronic device may output fourth feedback 1034 for the fourth candidate object 1024 based on the property value (e.g., red) of the first candidate property (e.g., the color), which is the representative property.

The electronic device may determine an object indicated in a voice input among candidate objects based on a property value of a representative property and/or a property value of a supplementary property specified in an additional command of the user.

For example, when the additional command of the user specifies a property value of a representative property of one candidate object among the candidate objects, the electronic device determines a corresponding candidate object as the object indicated in the voice input. For example, the additional command of the user, "The red one" may be obtained, and based on the additional command of the user specifying the property value of the representative property as "red", the electronic device determines the fourth candidate object 1024 as the object indicated in the voice input.

For example, when the additional command of the user specifies the property value of the supplementary property, the electronic device determines a candidate object having the property value of the supplementary property indicated by the additional command, among the candidate objects that have provided feedback based on the supplementary property, as the object indicated in the voice input. For example, the additional command of the user, "The one without wings" is obtained, and based on the additional command of the user specifying the property value of the supplementary property as "without wings", the electronic device determines the first candidate object 1021 as the object indicated in the voice input. The electronic device may the determination of a candidate object that has not output feedback based on the supplementary property as the object indicated in the voice input. For example, even though the property value of the supplementary property of the second candidate object 1022 and/or the fourth candidate object 1024 is also "without wings", since the second feedback 1032 and the fourth feedback 1034 for the second candidate object 1022 and the fourth candidate object 1024 are not based on the supplementary property, the second candidate object 1022 and the fourth candidate object 1024, that have not output the feedback based on the supplementary property based on the additional command specifying the property value of the supplementary property, may not be determined as the object indicated in the voice input.

Figure 11:
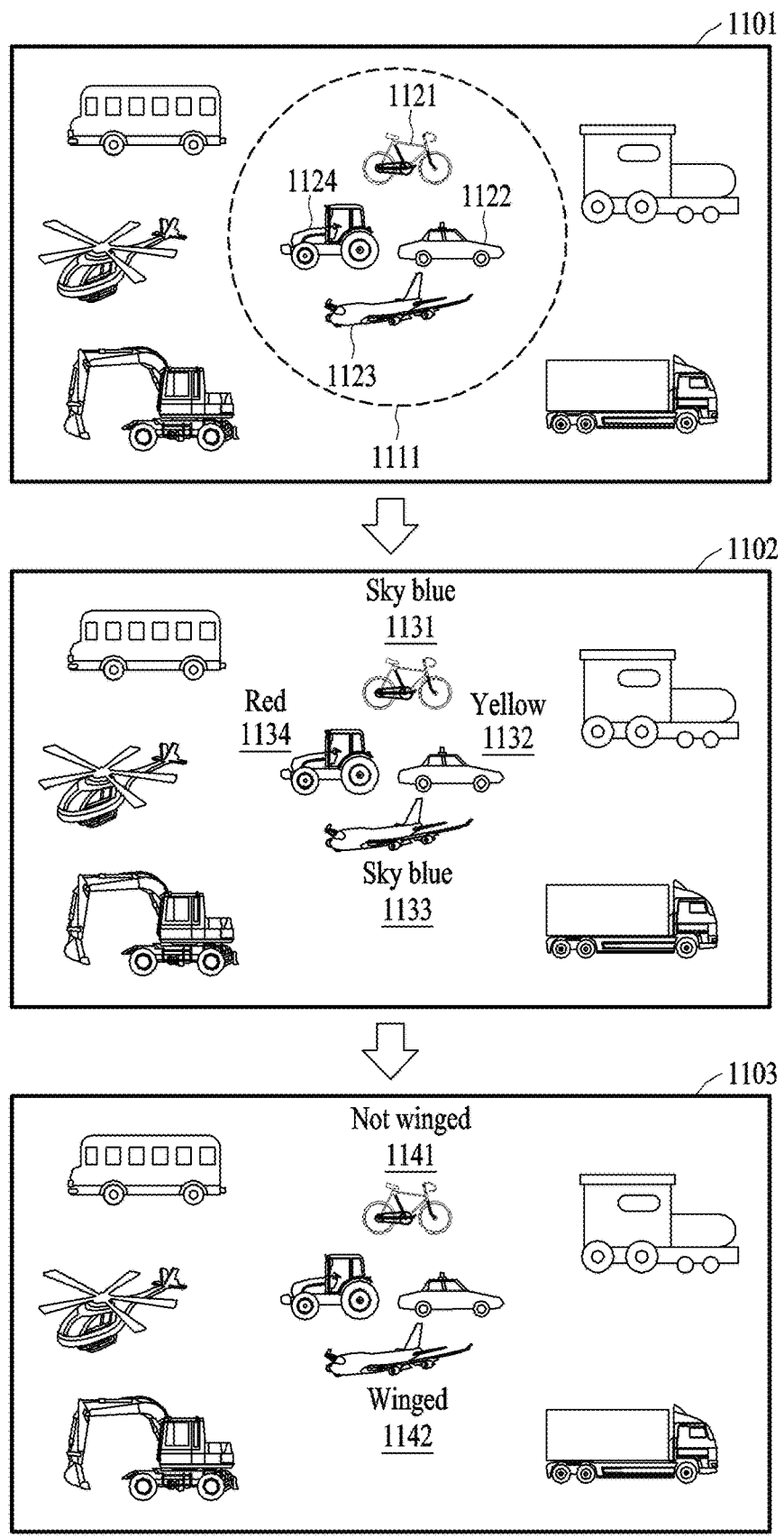
FIG. 11 is a diagram illustrating an example of an operation of outputting feedback based on a representative property and subsequently outputting feedback based on a supplementary property by an electronic device according to an embodiment of the disclosure.

FIG. 11 is a diagram illustrating an example of an operation of outputting feedback based on a representative property and subsequently outputting feedback based on a supplementary property by an electronic device according to an embodiment of the disclosure.

Referring to FIG. 11, an electronic device (the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7) according to an embodiment may determine a common representative property between candidate objects. The electronic device may obtain a first additional command of the user. Based on two or more candidate objects having a property value of a representative property indicated based on the first additional command of the user, the electronic device may determine a supplementary property between the two or more candidate objects and/or output feedback based on the supplementary property. The electronic device may obtain a second additional command of the user that specifies a property value of the supplementary property. The electronic device may determine an object indicated by a voice command based on the second command among the two or more candidate objects.

The electronic device may detect, based on the voice input of the user, a plurality of candidate objects (e.g., a first candidate object 1121, a second candidate object 1122, a third candidate object 1123, and a fourth candidate object 1124) in a viewing region 1111 of the user in a first display region 1101.

The electronic device may determine a representative property among candidate properties of the candidate objects. As described above with reference to FIG. 8, the electronic device may determine the representative property that is commonly applied to the candidate objects.

Referring to FIG. 11, the candidate properties may include a first candidate property (e.g., a color), a second candidate property (e.g., with or without wings), and a third candidate property (e.g., a category). Table 3 below shows an example of property values of the candidate objects for each of the candidate objects determined by the electronic device:

TABLE 3

|  | First candidate property (e.g., color) | Second candidate property (e.g., with or without wings) | Third candidate property (e.g., category) |
| --- | --- | --- | --- |
| First candidate object 1121 | Sky blue | Without wings | *Bicycle* |
| Second candidate object 1122 | Yellow | Without wings | *Car* |
| Third candidate object 1123 | Sky blue | With wings | *Airplane* |
| Fourth candidate object 1124 | Red | Without wings | *Car* |

The property value expressed in bold may represent property values of the common representative property of the plurality of candidate objects, and the property value expressed in italics may represent property values of a supplementary property.

An example of an operation in which the electronic device determines the common representative property of the candidate objects and determines the supplementary property will be described.

In FIG. 11, the representative property of the plurality of candidate objects may be determined as the first candidate property (e.g., color). The electronic device may output, for each of the candidate objects, feedback based on the property value of the representative property determined for the corresponding candidate object. For example, as shown in a second display region 1102 of FIG. 11, the electronic device outputs first feedback 1131 for the first candidate object 1121 based on the property value (e.g., sky blue) of the first candidate property (e.g., color), which is the representative property. The electronic device may output second feedback 1132 for the second candidate object 1122 based on the property value (e.g., yellow) of the first candidate property (e.g., the color), which is the representative property. The electronic device may output third feedback 1133 for the third candidate object 1123 based on the property value (e.g., sky blue) of the first candidate property (e.g., color), which is the representative property. The electronic device may output fourth feedback 1134 for the fourth candidate object 1124 based on the property value (e.g., red) of the first candidate property (e.g., the color), which is the representative property.

The electronic device may obtain an additional command that specifies the property value (e.g., sky blue) of the representative property (e.g., color). For example, as shown in FIG. 11, the electronic device obtains the additional command of the user, "The sky blue one". Based on the additional command of the user, the electronic device may determine two or more candidate objects (e.g., the first candidate object 1121 and the third candidate object 1123) in which the property value of the first candidate property (e.g., color), which is the representative property, is "sky blue".

Based on the two or more candidate objects (e.g., one candidate object and another candidate object) among the candidate objects having the property value of the representative property indicated by the additional command, the electronic device may determine a supplementary property of the two or more candidate objects (e.g., the one candidate object and the other candidate object). When the two or more candidate objects (e.g., the one candidate object and the other candidate object) among the candidate objects have the property value of the representative property indicated by the additional command, it may be difficult to determine one of candidate objects as the object indicated in the voice command by the additional command. Therefore, the electronic device may determine the supplementary property to distinguish the two or more candidate objects (e.g., the one candidate object and the other candidate object), and generate and/or output additional feedback based on the property value of the supplementary property.

According to an embodiment, the electronic device may determine, for each of the candidate properties, a supplementary property among candidate properties different from the representative property, based on a difference between property values of the two or more candidate objects (e.g., the one candidate object and the other candidate object). For example, similar to the determination of the supplementary property described above with reference to FIG. 10, the electronic device determines, as the supplementary property, a property in which a difference between property values of the one candidate object and the other candidate object is maximum. The electronic device may, instead of performing the determination based on a distribution of property values for all of the plurality candidate objects, perform the determination based on property values of the one candidate object and the other candidate object among the plurality of candidate objects, and may thus determine the supplementary property to distinguish the one candidate object and the other candidate object. Even when the property value of the supplementary property of the one candidate object is the same as or similar to a property value of a supplementary property of still another candidate object different from the other candidate object, the one candidate object may be distinguished from the other candidate object, and thus, it may be determined as the supplementary property.

In FIG. 11, for example, based on the first candidate object 1121 and the third candidate object 1123 having the property value (e.g., the sky blue) of the representative property (e.g., color) indicated by the additional command, the electronic device determines the supplementary property. The electronic device may determine the supplementary property of the first candidate object 1121 and the third candidate object 1123 among the second candidate property and the third candidate property that are different from the first candidate property, which is the representative property among the candidate properties. The electronic device may calculate a first difference between the property values of the second candidate property of the first candidate object 1121 and the third candidate object 1123 for the second candidate property. The electronic device may calculate a second difference between the property values of the third candidate property of the first candidate object 1121 and the third candidate object 1123 for the third candidate property. The electronic device may normalize the first difference and the second difference, and determine the second candidate property (e.g., with or without wings) as the supplementary property based on the first difference having a larger value among the normalized first difference and second difference.

For each of the two or more candidate objects (e.g., the one candidate object and the other candidate object), the electronic device may output additional feedback based on the property value of the supplementary property of a corresponding candidate object. For example, as shown in a third display region 1103 of FIG. 11, the electronic device outputs additional feedback 1131 for the first candidate object 1121 based on the property value (e.g., without wings) of the second candidate property (e.g., with or without wings), which is the supplementary property. The electronic device may output second additional feedback 1142 for the third candidate object 1123 based on the property value (e.g., with wings) of the second candidate property (e.g., with or without wings), which is the supplementary property.

The electronic device may stop outputting the feedback based on the property value of the representative property of the candidate objects. For example, as shown in the third display region 1103 of FIG. 11, the electronic device stops outputting the first feedback 1131, the second feedback 1132, the third feedback 1133, and/or the fourth feedback 1134 based on the property values of the representative property.

The electronic device may obtain an additional command (e.g., the second additional command) that specifies the property value of the supplementary property, that is subsequent to the first additional command (e.g., the additional command that specifies the property value of the representative property). The electronic device may determine, based on the second additional command, an object having the property value of the supplementary property indicated in the second additional command among the candidate objects (e.g., the first candidate object 1121 and the third candidate object 1123) that have output the additional feedback based on the property value of the supplementary property, as the object indicated in the voice command. For example, the second additional command of the user, "The one without wings" is obtained, and based on the second additional command of the user specifying the property value of the supplementary property as "without wings", the electronic device determines the first candidate object 1121 as the object indicated in the voice input.

Figure 12:
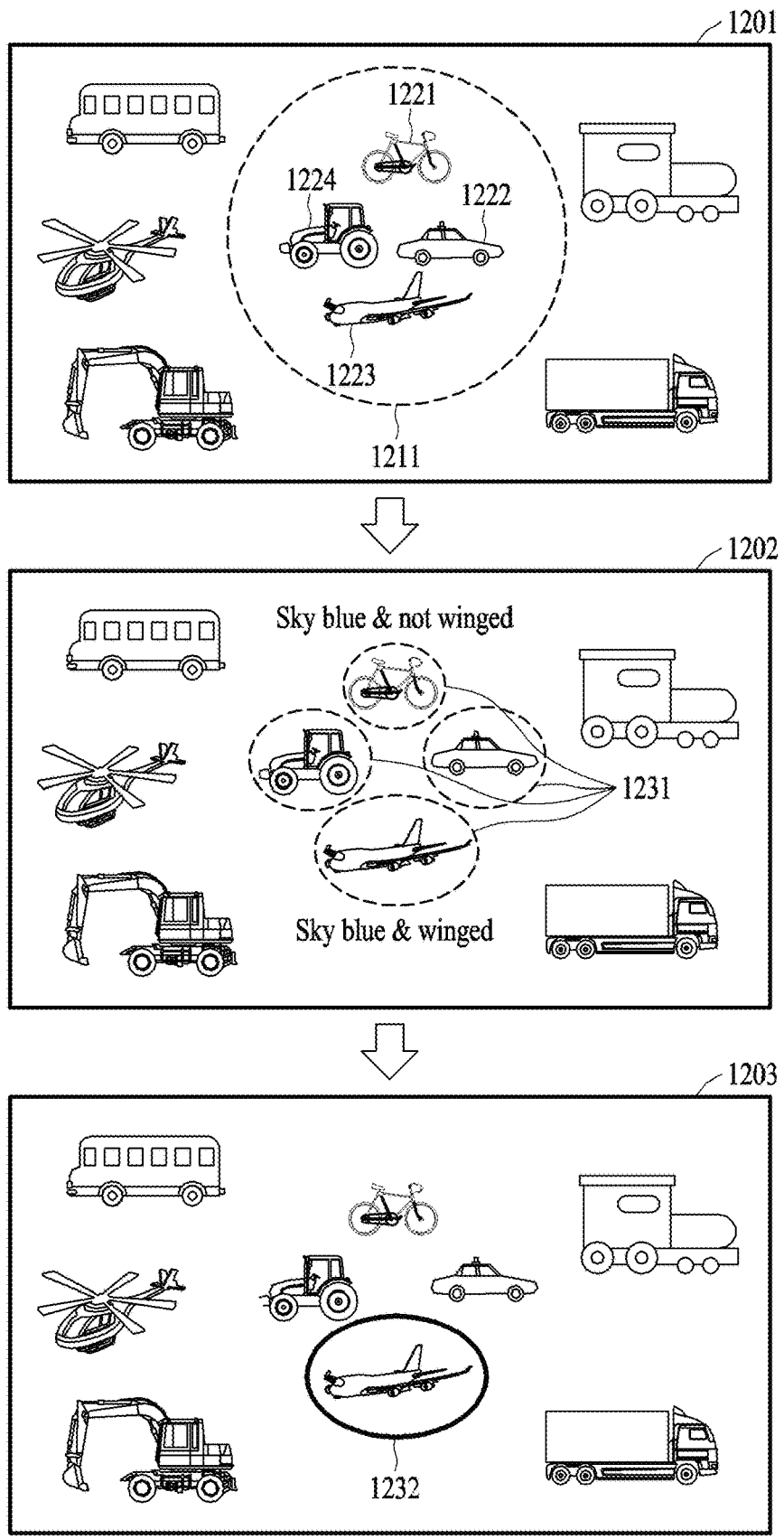
FIG. 12 is a diagram illustrating an example of an operation of providing visual feedback for candidate objects and an object determined as an object indicated in a voice command among the candidate objects by an electronic device according to an embodiment of the disclosure.

FIG. 12 is a diagram illustrating an example of an operation of providing visual feedback for candidate objects and an object determined as an object indicated in a voice command among the candidate objects by an electronic device according to an embodiment of the disclosure.

Referring to FIG. 12, an electronic device (the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7) according to an embodiment may display a first graphic representation 1231 for candidate objects, and when an object indicated in a voice command is determined among candidate objects, display a second graphic representation 1232 for the corresponding object. The electronic device may provide visual feedback for a process of determining the object indicated in the voice command to the user through display of the first graphic representation 1231 and/or the second graphic representation 1232.

The electronic device may detect a plurality of candidate objects (e.g., a first candidate object 1221, a second candidate object 1222, a third candidate object 1223, and a fourth candidate object 1224) in a viewing region 1211 of the user of a first display region 1201 based on a voice input of the user.

The electronic device may display, based on detecting candidate objects, the first graphic representation 1231 in a region corresponding to each of the detected candidate objects.

For example, as shown in a second display region 1202 of FIG. 12, the electronic device displays the first graphic representation 1231 in a region corresponding to each of the first candidate object 1221, the second candidate object 1222, the third candidate object 1223, and the fourth candidate object 1224.

The electronic device may determine the object indicated in the voice command among the candidate objects based on the additional command. For example, the electronic device determines the third candidate object 1223 among the candidate objects as the object indicated in the voice command.

The electronic device may display, based on determining the object indicated in the voice command, the second graphic representation 1232 in a region corresponding to the determined object. For example, as shown in a third display region 1203 of FIG. 12, the electronic device displays the second graphic representation 1232 in a region corresponding to the third candidate object 1223.

According to an embodiment, the second graphic representation 1232 may have a characteristic that may attract the user's attention more than the first graphic representation 1231. For example, a contrast with a surrounding region of the second graphic representation 1232 is greater than a contrast of the first graphic representation 1231. For example, when the first graphic representation 1231 and the second graphic representation 1232 each include a line, the line included in the first graphic representation 1231 is thinner than the line included in the second graphic representation 1232. For example, a transparency of the first graphic representation 1231 is higher than a transparency of the second graphic representation 1232.

Figure 13:
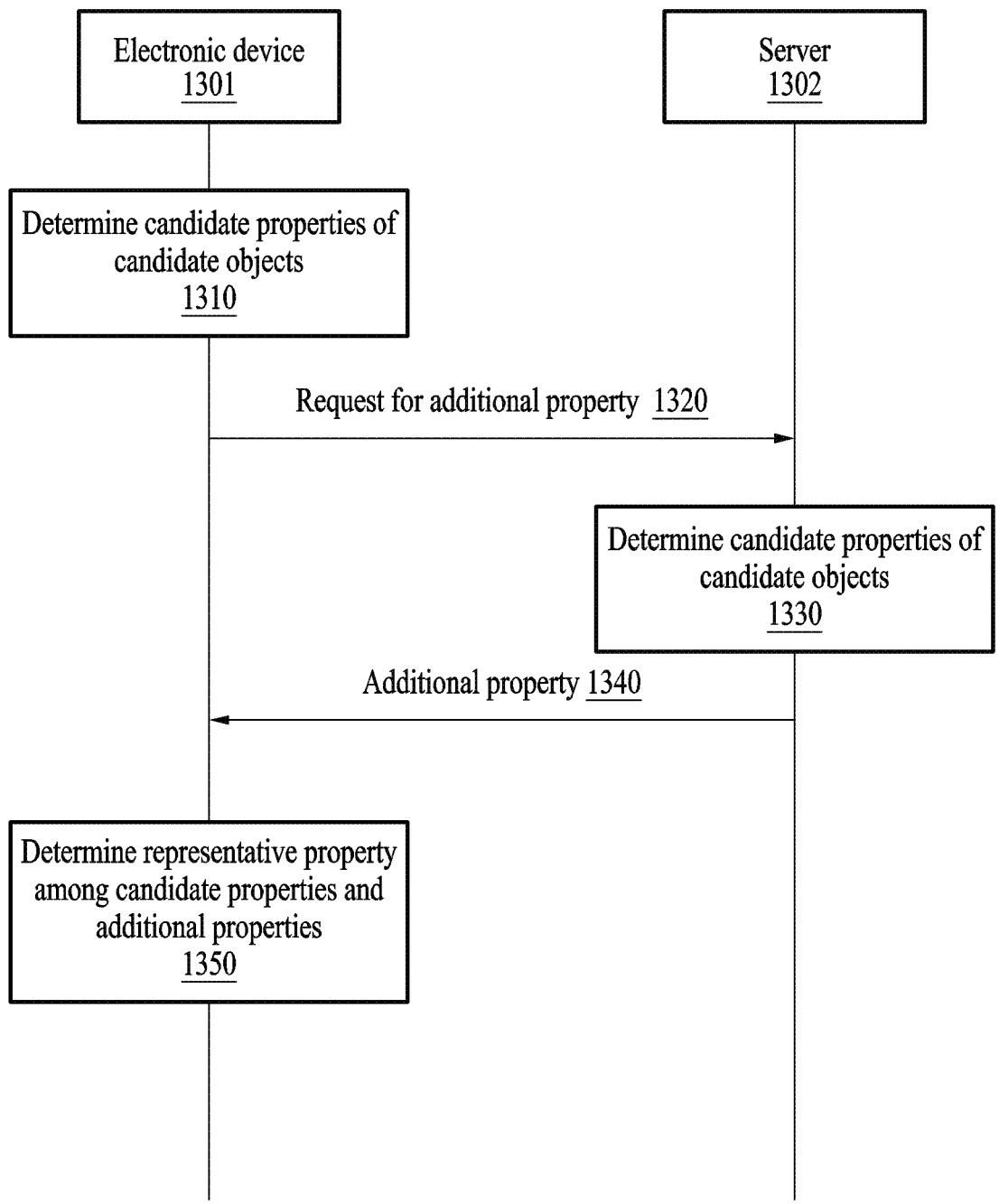
FIG. 13 is a diagram illustrating an example of an operation of determining candidate properties and additional properties of candidate objects by an electronic device and a server according to an embodiment of the disclosure.

FIG. 13 is a diagram illustrating an example of an operation of determining candidate properties and additional properties of candidate objects by an electronic device and a server according to an embodiment of the disclosure.

Referring to FIG. 13, an electronic device 1301 (the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7) according to an embodiment may determine candidate properties of candidate objects. The electronic device 1301 may determine a representative property based on additional properties of candidate objects received from a server 1302 (e.g., the server 702 of FIG. 7) along with the candidate properties of the candidate objects, and output feedback based on a property value of the representative property.

In operation 1310, the electronic device may detect candidate objects based on a voice input. The electronic device may determine candidate properties of detected candidate objects and property values of candidate properties.

In operation 1320, the electronic device may request for an additional property of the candidate objects from the server. The electronic device may transfer a request for the additional property to the server. The server may receive the request for the additional property from the electronic device. According to an embodiment, the electronic device may transfer a request for additional properties to the server based on a distribution of property values of the candidate objects among the candidate properties. For example, when variances of the property values of the candidate objects among candidate properties are all less than or equal to a threshold, the electronic device transfers the request for the additional property to the server. According to an embodiment, based on obtaining an input for providing feedback based on the additional property from the user, the electronic device may transfer the request for the additional property to the server.

The request for the additional property may include at least one of a voice command of a user, a display region, a viewing region, candidate objects, candidate properties, or property values of candidate properties.

In operation 1330, based on the request for the additional property, the server may determine information about the additional properties of the candidate objects. The information about the additional properties may include the additional property and a property value of the additional property of each of the candidate objects.

According to an embodiment, the additional property determined by the server may be finer than the candidate property determined by the electronic device. The electronic device may determine properties corresponding to a coarse feature between candidate objects as candidate properties. When it is not easy to distinguish the candidate objects from each other by candidate properties representing the coarse feature, the electronic device may request for the additional property which is a property corresponding to a fine feature. When there is a level between properties, a property belonging to a first level may correspond to a feature that is coarser than a feature corresponding to a property belonging to a second level that is lower than the first level. The server may determine a property at a level lower than that of the candidate property determined by the electronic device as the additional property. For example, the property at the first level may be the country of origin, and the property at the second level is the city of origin. The electronic device may determine the country of origin as the candidate property, and a property value (e.g., France, Germany, or Spain) of each candidate object. The server may determine the city of origin as the additional property, and a property value (e.g., Paris, Berlin, or Madrid) of each candidate object.

In operation 1340, the server may transfer information about the additional properties of the candidate objects to the electronic device. The electronic device may receive the information about the additional properties of the candidate objects from the server.

For example, the server transfers the additional properties determined by the electronic device and property values of the additional properties of the candidate objects. The electronic device may receive the additional properties and the property values of the additional properties of the candidate objects from the server.

In operation 1350, the electronic device may determine a representative property among the candidate properties and the additional properties. An operation of determining the representative property among the candidate properties and the additional properties by the electronic device may be performed by replacing the candidate properties with the candidate properties and the additional properties in operation 820 of determining the representative property described above with reference to FIG. 8.

The electronic device according to embodiments may be one of various types of electronic devices. The electronic device includes, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. As used herein, "A or B", "at least one of A and B", "at least one of A or B", "A, B or C", "at least one of A, B and C", and "at least one of A, B, or C," may include any one of the items listed together in the corresponding one of the phrases, or all possible combinations thereof. Terms such as "$1^{st}$", "$2^{nd}$", or "first" or "second" may simply be used to distinguish the component from other components in question, and do not limit the components in other aspects (e.g., importance or order). It is to be understood that if a component (e.g., a first component) is referred to, with or without the term "operatively" or "communicatively", as "coupled with," "coupled to," "connected with," or "connected to" another component (e.g., a second component), the component may be coupled with the other component directly (e.g., by wire), wirelessly, or via a third component.

As used in connection with embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module is implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) invokes at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least portion of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

The embodiments described herein may be implemented using a hardware component, a software component, and/or a combination thereof. A processing device may be implemented using one or more general-purpose or special-purpose computers, such as, for example, a processor, a controller, an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will appreciate that a processing device may include multiple processing elements and/or multiple types of processing elements. For example, the processing device includes a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, digital versatile discs (DVDs), and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
memory storing one or more computer programs; and
one or more processors communicatively coupled to the display and the memory,
wherein the one or more computer programs include computer-executable instructions that, when executed by the one or more processors individually or collectively, cause the electronic device to:
detect, based on a first voice command obtained from a user gazing towards a viewing region, candidate objects in the viewing region of the user,
determine, based on a distribution of property values of a corresponding candidate property of candidate objects for each candidate property, a representative property among candidate properties of the detected candidate objects, wherein the representative property is for distinguishing between candidate objects, wherein the candidate properties define individual characteristics of each of the candidate objects, output to the display, for each of the detected candidate objects, feedback based on a property value of the representative property of a corresponding candidate object, and determine, based on obtaining an additional voice command that specifies a property value of the representative property from the user, an object indicated in the first voice command as a candidate object having the property value of the representative property specified by the additional voice command.

2. The electronic device of claim 1, wherein the one or more computer programs further include computer-executable instructions that, when executed by the one or more processors individually or collectively, cause the electronic device to:

determine whether an object is indicated using a pronoun in the first voice command, and detect, based on the object being indicated using the pronoun in the first voice command, the candidate objects for the object indicated by the pronoun.

3. The electronic device of claim 2, wherein the one or more computer programs further include computer-executable instructions that, when executed by the one or more processors individually or collectively, cause the electronic device to:

extract conditions for the object from the first voice command, and detect the candidate objects in the viewing region based on the extracted conditions.

4. The electronic device of claim 1, wherein the one or more computer programs further include computer-executable instructions that, when executed by the one or more processors individually or collectively, cause the electronic device to:

determine, for each of the candidate objects, based on a difference between the property value of the representative property of the corresponding candidate object and property values of other candidate objects, a representative property of the corresponding candidate object, and determine a candidate property different from a representative property of a first candidate object among the candidate objects as a representative property of a second candidate object.

5. The electronic device of claim 1, wherein the one or more computer programs further include computer-executable instructions that, when executed by the one or more processors individually or collectively, cause the electronic device to:

determine, based on a difference between property values of the representative property of a first candidate object and a second candidate object among the candidate objects being less than or equal to a threshold, a supplementary property for the first candidate object and the second candidate object, and output, for each of the first candidate object and the second candidate object, the feedback based on the property value of the representative property of the corresponding candidate object and a property value of the supplementary property of the corresponding candidate object.

6. The electronic device of claim 1, wherein the one or more computer programs further include computer-executable instructions that, when executed by the one or more processors individually or collectively, cause the electronic device to:

determine, based on a first candidate object and a second candidate object among the candidate objects having property value of the representative property specified by the additional voice command, a supplementary property for the first candidate object and the second candidate object, output, for each of the first candidate object and the second candidate object, additional feedback based on a property value of the supplementary property of the corresponding candidate object, and stop outputting the feedback based on the property value of the representative property of the candidate objects.

7. The electronic device of claim 1, wherein the one or more computer programs further include computer-executable instructions that, when executed by the one or more processors individually or collectively, cause the electronic device to:

display, based on detecting the candidate objects, a first graphic representation in a region corresponding to each of the detected candidate objects, and display, based on determining the object indicated in the first voice command, a second graphic representation in a region corresponding to the determined object.

8. The electronic device of claim 1, wherein the one or more computer programs further include computer-executable instructions that, when executed by the one or more processors individually or collectively, cause the electronic device to:

exclude a property with property values of the candidate objects having a difference less than or equal to a threshold, from the candidate properties.

9. The electronic device of claim 1, wherein the one or more computer programs further include computer-executable instructions that, when executed by the one or more processors individually or collectively, cause the electronic device to:

receive information about additional properties of the detected candidate objects from a server, and determine the representative property among the candidate properties of the candidate objects and the additional properties of the candidate objects.

10. The electronic device of claim 1, wherein the one or more computer programs further include computer-executable instructions that, when executed by the one or more processors individually or collectively, cause the electronic device to:

provide feedback for each candidate object, such that a user recognizes at least one of the property value of the representative property or a supplementary property of the corresponding candidate object determined by a feature extraction module.

11. The electronic device of claim 1, wherein the one or more computer programs further include computer-executable instructions that, when executed by the one or more processors individually or collectively, cause the electronic device to:

generate, for the candidate object, auditory feedback corresponding to at least one of the property value of the representative property or a supplementary property of the corresponding candidate object.

12. The electronic device of claim 1, wherein the one or more computer programs further include computer-executable instructions that, when executed by the one or more processors individually or collectively, cause the electronic device to:

transmit a request for providing additional properties of the detected candidate objects to a server.

13. A method performed by an electronic device, the method comprising:
- detecting, by the electronic device, based on a first voice command obtained from a user gazing at a viewing region, candidate objects in the viewing region of the user;
- determining, by the electronic device, based on a distribution of property values of a corresponding candidate property of candidate objects for each candidate property, a representative property among candidate properties of the detected candidate objects, wherein the representative property is for distinguishing between candidate objects, wherein the candidate properties define individual characteristics of each of the candidate objects;
- outputting to a display, by the electronic device, for each of the candidate objects, feedback based on a property value of the representative property of a corresponding candidate object; and
- determining, by the electronic device, based on obtaining an additional voice command that specifies a property value of the representative property from the user, an object indicated in the first voice command as a candidate object having the property value of the representative property specified by the additional voice command.

14. The method of claim 13, wherein the detecting of the candidate objects comprises:
- determining whether an object is indicated using a pronoun in the first voice command; and
- detecting, based on the object being indicated using the pronoun in the first voice command, the candidate objects for the object indicated by the pronoun.

15. The method of claim 14, wherein the detecting of the candidate objects comprises:
- extracting conditions for the object from the first voice command; and
- detecting the candidate objects in the viewing region based on the extracted conditions.

16. The method of claim 13, wherein the determining of the representative property comprises:
- determining, for each of the candidate objects, based on a difference between the property value of the representative property the corresponding candidate object and property values of other candidate objects, a representative property of the corresponding candidate object; and
- determining a candidate property different from a representative property of a first candidate object among the candidate objects as a representative property of a second candidate object.

17. The method of claim 13, further comprising:
- determining, based on a difference between property values of the representative property of a first candidate object and a second candidate object among the candidate objects being less than or equal to a threshold, a supplementary property for the first candidate object and the second candidate object; and
- outputting, for each of the first candidate object and the second candidate object, the feedback based on the property value of the representative property of the corresponding candidate object and a property value of the supplementary property of the corresponding candidate object.

18. One or more non-transitory computer-readable storage media storing one or more computer programs including computer-executable instructions that, when executed by one or more processors of an electronic device individually or collectively, cause the electronic device to perform operations, the operations comprising:
- detecting, by the electronic device, based on a first voice command obtained from a user gazing at a viewing region, candidate objects in a viewing region of the user;
- determining, based on a distribution of property values of a corresponding candidate property of candidate objects for each candidate property, by the electronic device, a representative property among candidate properties of the detected candidate objects, wherein the representative property is for distinguishing between candidate objects, wherein the candidate properties define individual characteristics of each of the candidate objects;
- outputting to a display, by the electronic device, for each of the detected candidate objects, feedback based on a property value of the representative property of a corresponding candidate object; and
- determining, by the electronic device, based on obtaining an additional voice command that specifies a property value of the representative property from the user, an object indicated in the first voice command as a candidate object having the property value of the representative property specified by the additional voice command.

* * * * *